US012440765B2

(12) United States Patent
Sano et al.

(10) Patent No.: US 12,440,765 B2
(45) Date of Patent: Oct. 14, 2025

(54) STORAGE MEDIUM, GAME SYSTEM AND GAME CONTROL METHOD

(71) Applicant: Nintendo Co., Ltd., Kyoto (JP)

(72) Inventors: Shinya Sano, Kyoto (JP); Kodai Matsumoto, Kyoto (JP); Takaki Abe, Osaka (JP)

(73) Assignee: NINTENDO CO., LTD., Kyoto (JP)

( * ) Notice: Subject to any disclaimer, the term of this patent is extended or adjusted under 35 U.S.C. 154(b) by 188 days.

(21) Appl. No.: 18/339,638

(22) Filed: Jun. 22, 2023

(65) Prior Publication Data

US 2024/0033635 A1 Feb. 1, 2024

(30) Foreign Application Priority Data

Jul. 29, 2022 (JP) ................................ 2022-122148

(51) Int. Cl.
*A63F 13/57* (2014.01)
*A63F 13/52* (2014.01)

(52) U.S. Cl.
CPC .............. *A63F 13/57* (2014.09); *A63F 13/52* (2014.09)

(58) Field of Classification Search
CPC .......... A63F 13/25; A63F 13/45; A63F 13/50; A63F 13/52; A63F 13/57; A63F 13/70
See application file for complete search history.

(56) References Cited

U.S. PATENT DOCUMENTS 6,200,138 B1 3/2001 Ando et al.
8,157,654 B2 * 4/2012 Link ...................... A63F 13/52 463/43
8,308,560 B2 11/2012 Tawara et al.
(Continued)

FOREIGN PATENT DOCUMENTS

JP 2006075616 A 3/2006
JP 2009131652 A 6/2009
(Continued)

OTHER PUBLICATIONS

A destination is clearer! Adding guide arrows to all main quests! Development blog to Puchitto Kuronikuru [online], Jun. 27, 2013, <URL:https://pcro.jp/blog/?p=2717>, [searched on Feb. 28, 2024].
(Continued)

*Primary Examiner* — Omkar A Deodhar
(74) *Attorney, Agent, or Firm* — Scully, Scott, Murphy & Presser, P.C.

(57) ABSTRACT

A non-limiting example game system includes a main body apparatus that executes a virtual game, and a game screen is displayed on a display. On the game screen, a player character and background objects such as a floor, stairs and a door are displayed, an indicating object is displayed so as to surround the player character. The indicating object is an object that indicates a direction that the player character is to move, and specifically, indicates a target point set in a virtual space. The indicating object includes a first direction indicating portion of a circular shape or cylindrical shape and a second direction indicating portion of a triangular shape, and a horizontal orientation and a lean are controlled so that a direction toward a colored portion from a non-colored portion of the first direction indicating portion faces the target point.

24 Claims, 28 Drawing Sheets

(56) References Cited

U.S. PATENT DOCUMENTS

| | | | | |
|---|---|---|---|---|
| 9,928,650 | B2 * | 3/2018 | Inomata | G06T 19/006 |
| 2007/0202936 | A1 * | 8/2007 | Ishii | A63F 13/833<br>463/8 |
| 2012/0058829 | A1 * | 3/2012 | Yanagisawa | A63F 13/812<br>463/43 |
| 2016/0203646 | A1 * | 7/2016 | Nadler | G02B 27/017<br>345/419 |
| 2019/0054377 | A1 * | 2/2019 | Nelson | A63F 13/213 |
| 2019/0366212 | A1 * | 12/2019 | Kusakihara | A63F 13/426 |
| 2020/0368616 | A1 * | 11/2020 | Delamont | H04N 13/239 |
| 2021/0308573 | A1 * | 10/2021 | Higashi | A63F 13/52 |
| 2022/0139020 | A1 * | 5/2022 | Zhang | A63F 13/67<br>345/419 |

FOREIGN PATENT DOCUMENTS

| | | | |
|---|---|---|---|
| JP | 2010187940 | A | 9/2010 |
| JP | 2010262523 | A | 11/2010 |
| JP | 2017058777 | A | 3/2017 |

OTHER PUBLICATIONS

Playing video of Nintendo Switch Implosion, YouTube [online] [video] Jul. 6, 2017 <URL:https://www.youtube.com/watch?v=KQiBCwws5XQ> [searched on Feb. 28, 2024].

"Houkai 3rd" Navigation design allowing users to always know the best route, Game App UI Design [online] Feb. 23, 2022, <URL:https://appgameui.hatenablog.com/entry/2022/02/23/235905> [searched on Feb. 28, 2024].

* cited by examiner

GAME SCREEN 200

TOP VIEW (VIRTUAL CAMERA IN HORIZONTAL DIRECTION)

SIDE VIEW

TOP VIEW (VIRTUAL CAMERA IN DIAGONALLY UPWARD DIRECTION OR DIAGONALLY DOWNWARD DIRECTION)

SIDE VIEW

STORAGE MEDIUM, GAME SYSTEM AND GAME CONTROL METHOD

CROSS REFERENCE OF RELATED APPLICATION

This application claims a priority to Japanese Patent Application No. 2022-122148 filed on Jul. 29, 2022, and the entire contents of which are incorporated herein by reference.

FIELD

This application describes a storage medium, a game system and a game control method, in which a player moves a player character in a virtual space to advance a virtual game.

SUMMARY

It is a primary object of an embodiment(s) to provide a novel storage medium, game system and game control method.

Moreover, it is another object of the embodiment(s) to provide a storage medium, game system and game control method, capable of confirming always a direction that a player character is to move, and also confirming a positional relationship in a height direction between the player character and a target point.

A first embodiment is a non-transitory computer-readable storage medium having stored with a game program executable by an information processing apparatus, wherein the game program causes one or more processors of the information processing apparatus to execute: setting a predetermined position in a virtual space as a target point; arranging an indicating object having a first portion ad a second portion within a predetermined range on the basis of a position of a player character in the virtual space; moving the player character in the virtual space based on an operation input by a player; updating an orientation of the indicating object so that the first portion becomes a position closer to the target point than the player character and the second portion becomes a position farther from the target point than the player character, and a horizontal component of a direction toward the first portion from the second portion faces the target point; updating, based on a component of a height direction of a direction toward the target point from the position of the player character, a height of an end portion of the first portion on a side of the target point; and generating, based on a virtual camera in the virtual space, a display image including at least the indicating object and the player character.

According to the first embodiment, since the indicating object is arranged within the predetermined range on the basis of the position of the player character, it is possible to always confirm a direction that the player character is to move. Moreover, since the height of the end portion of the first portion on a side of the target point is updated based on a component of a height direction of a direction toward the target point from the position of the player character, it is also possible to confirm a positional relationship in the height direction between the player character and the target point.

A second embodiment is the storage medium according to the first embodiment, wherein the indicating object includes a first object and a direction indicating portion indicating a direction up to the target point, and the game program further causes the one or more processors to execute: arranging the first object so as to surround the player character; updating the orientation of the indicating object by rotating the indicating object around a center of the first object so that the direction indicating portion faces the target point with respect to a horizontal direction; and updating the height of the direction indicating portion by changing, based on a component of a height direction of a direction toward the target point from the position of the plyer character, a lean of the indicating object.

According to the second embodiment, since the height of the direction indicating portion is updated by changing the lean of the indicating object, it is possible to confirm the positional relationship in the height direction between the player character and the target point.

A third embodiment is the storage medium according to the second embodiment, wherein the first object is a circular-ring-shape or a cylindrical shape, and the first portion is a first circular arc that is a part of the first object on a side of the direction indicating portion, and the second portion is a second circular arc that is a part of the first object on a side opposite to the direction indicating portion.

According to the third embodiment, since the first object is the circular-ring-shape or the cylindrical shape, it is possible to confirm the positional relationship in the height direction between the player character and the target point by just looking the lean of the circular arc of the circular-ring-shape or the cylindrical shape.

A fourth embodiment is the storage medium according to the second embodiment, wherein the direction indicating portion is a triangular shape, and the game program causes the one or more processors to execute arranging the direction indicating portion so that a predetermined tip end of the direction indicating portion faces a side of the target point.

According to the fourth embodiment, since the direction indicating portion is a triangular shape, and the predetermined tip end of the direction indicating portion is turned to a target point side, it is possible to indicate a moving direction of the player character by the tip end of the triangular shape.

A fifth embodiment is the storage medium according to the second embodiment, wherein a part of the first object is rendered with a visual feature different from another part of the first object.

According to the fifth embodiment, since a part of the first object and other portions thereof have the different visual feature, it is possible to know an orientation of the indicating object based on the different visual feature that the first object has.

A sixth embodiment is the storage medium according to the second embodiment, wherein the game program causes the one or more processors to execute: generating a second object when a relationship between the player character and the target point satisfies a predetermined condition; and moving the second object toward the target point from the first object.

According to the sixth embodiment, since the second object is moved toward the target point, it is possible to make an attention of a player turn to the target point.

A seventh embodiment is the storage medium according to the sixth embodiment, wherein the game program causes the one or more processors to execute arranging the indicating object in the virtual space during when the predetermined condition is not satisfied while not arranging the indicating object in the virtual space during when the predetermined condition is being satisfied.

According to the seventh embodiment, it is possible to turn the attention of the player to the target point than the sixth embodiment by not arranging the indicating object.

An eighth embodiment is the storage medium according to the first embodiment, wherein the first portion has a first end portion and includes an arrow-shaped plane having a tip end at a side of the first end portion, and the second portion has a second end portion and a plane having a tip end at an opposite side to a side of the second end portion, wherein the game program causes the one or more processors to execute: arranging the first portion and the second portion so as to sandwich the player character; and deforming the first portion or changing a lean of the first portion so that a height of the first end portion is changed based on a component of the height direction of a direction toward the target point from the position of the player character.

According to the eighth embodiment, since the first portion, the player character and the second portion are aligned on a straight line, even if the first portion or the second portion cannot be seen, it is possible to conjecture an invisible a portion of the indicating object from a positional relationship between a visible one of the first portion and the second portion and the player character, thereby to grasp a positional relationship in the horizontal direction.

A ninth embodiment is the storage medium according to the eighth embodiment, wherein the second portion is a shape including a triangular plane, and the game program causes the one or more processors to execute arranging the second portion so that the tip end faces a side of the target point.

According to the ninth embodiment, the target point can be indicated with the tip end of the second portion.

A tenth embodiment is the storage medium according to the eighth embodiment, wherein the game program causes the one or more processors to execute: deforming the first portion or changing the lean of the first portion when the position of the player character is higher than the target point so that the position of the first end portion becomes a position lower than a position of the first end portion in a case where the position of the player character is not higher than the target point; and deforming the first portion or changing the lean of the first portion when the position of the player character is lower than the target point so that the position of the first end portion becomes a position higher than the position of the first end portion in a case where the position of the player character is not lower than the target point.

According to the tenth embodiment, it is possible to know the positional relationship between the current position of the player character and the target point because the position of the first end portion of the first portion is changed.

An eleventh embodiment is the storage medium according to the eighth embodiment, wherein the game program causes the one or more processors to execute: rotating the first portion so that a part of the arrow-shaped plane of the first portion faces a direction of the virtual camera; and further deforming the first portion or further changing the lean of the first portion while maintaining the position of the first end portion when the first portion is rotated.

According to the eleventh embodiment, since a part of the arrow-shaped plane of the first portion is rotated so as to face the direction of the virtual camera, it is possible to know the direction of the target point by seeing the arrow-shaped plane even if the virtual camera is moved to any position.

A twelfth embodiment is a game system comprising one or more processors, wherein the one or more processors executes: setting a predetermined position in a virtual space as a target point; arranging an indicating object having a first portion ad a second portion within a predetermined range on the basis of a position of a player character in the virtual space; moving the player character in the virtual space based on an operation by a player; updating an orientation of the indicating object so that the first portion becomes a position closer to the target point than the player character and the second portion becomes a position farther from the target point than the player character, and a horizontal component of a direction toward the first portion from the second portion faces the target point; updating, based on a component of a height direction of a direction toward the target point from the position of the player character, a height of an end portion of the first portion on a side of the target point; and generating, based on a virtual camera in the virtual space, a display image including at least the indicating object and the player character.

A thirteenth embodiment is a game control method in a game apparatus comprising one or more processors, wherein the game control method causes the one or more processors to execute: setting a predetermined position in a virtual space as a target point; arranging an indicating object having a first portion ad a second portion within a predetermined range on the basis of a position of a player character in the virtual space; moving the player character in the virtual space based on an operation input by a player; updating an orientation of the indicating object so that the first portion becomes a position closer to the target point than the player character and the second portion becomes a position farther from the target point than the player character, and a horizontal component of a direction toward the first portion from the second portion faces the target point; updating, based on a component of a height direction of a direction toward the target point from the position of the player character, a height of an end portion of the first portion on a side of the target point; and generating, based on a virtual camera in the virtual space, a display image including at least the indicating object and the player character.

In also the twelfth embodiment and the thirteenth embodiment, similar to the first embodiment, it is possible to always confirm a direction that the player character is to move, and also to confirm a positional relationship in the height direction between the player character and the target point.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

First Embodiment

A non-limiting example game system according to an exemplary embodiment will be described in the following. The non-limiting example game system 1 according to the first embodiment comprises a main body apparatus (an information processing apparatus that functions as a game apparatus main body in the first embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to the first embodiment will be described, and then, the control of the game system 1 of the first embodiment will be described.

Figure 1:
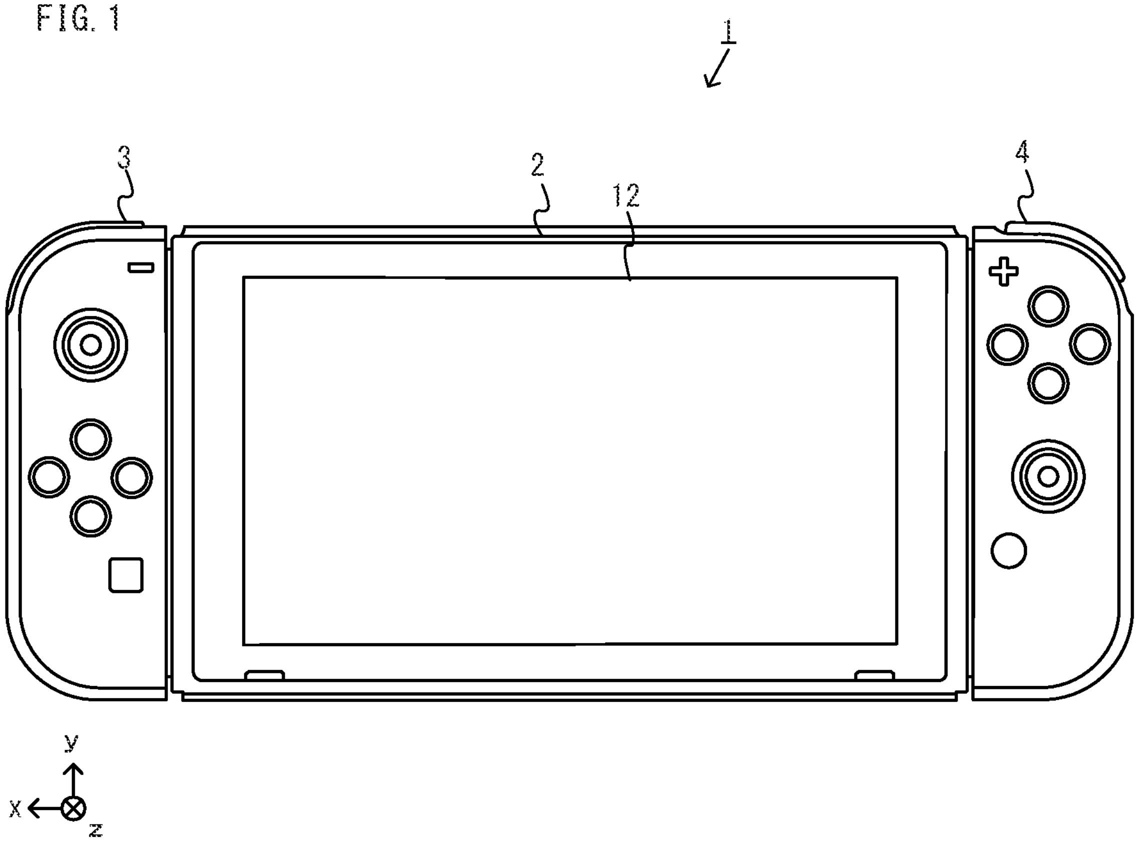
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
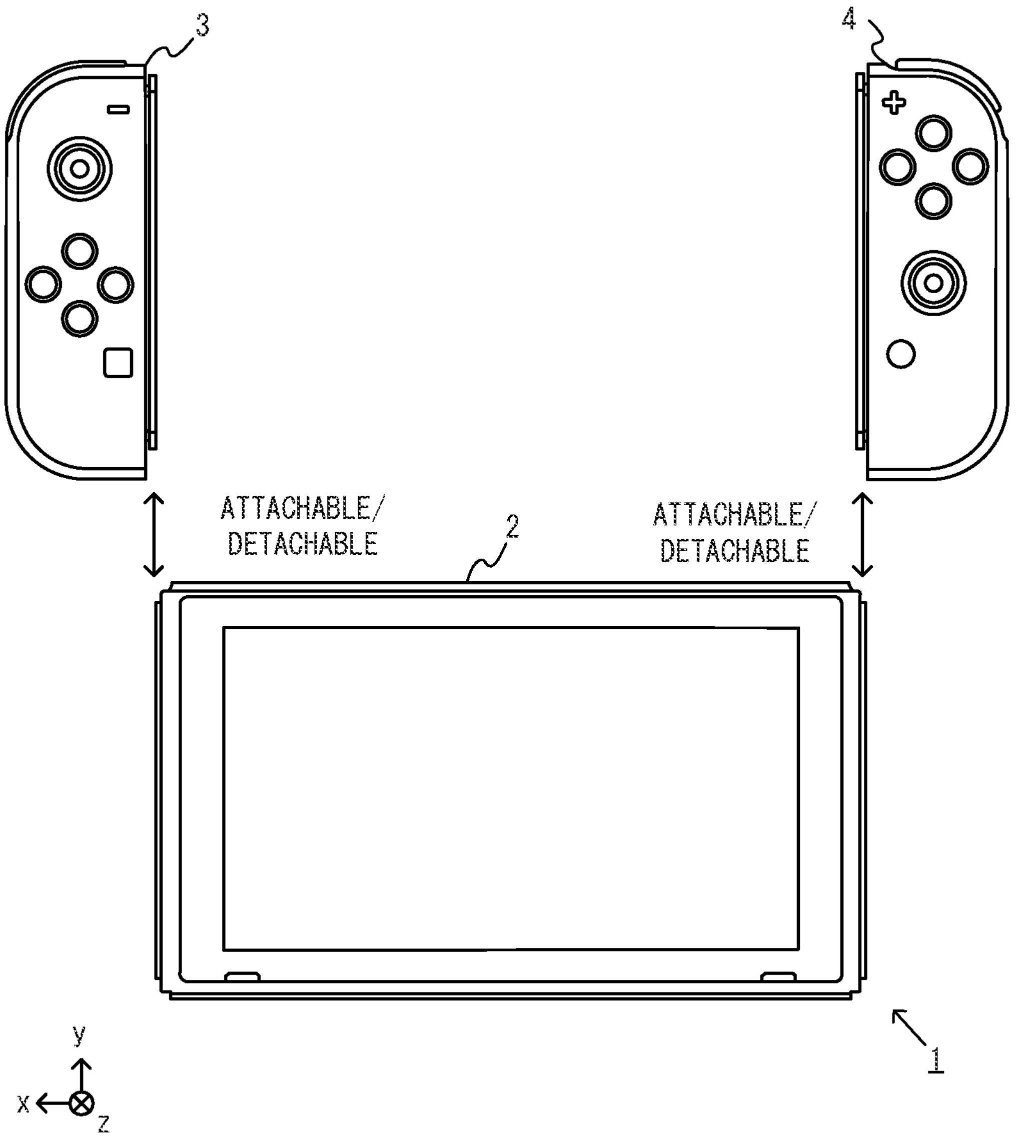
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a “controller” in the following.

Figure 3:
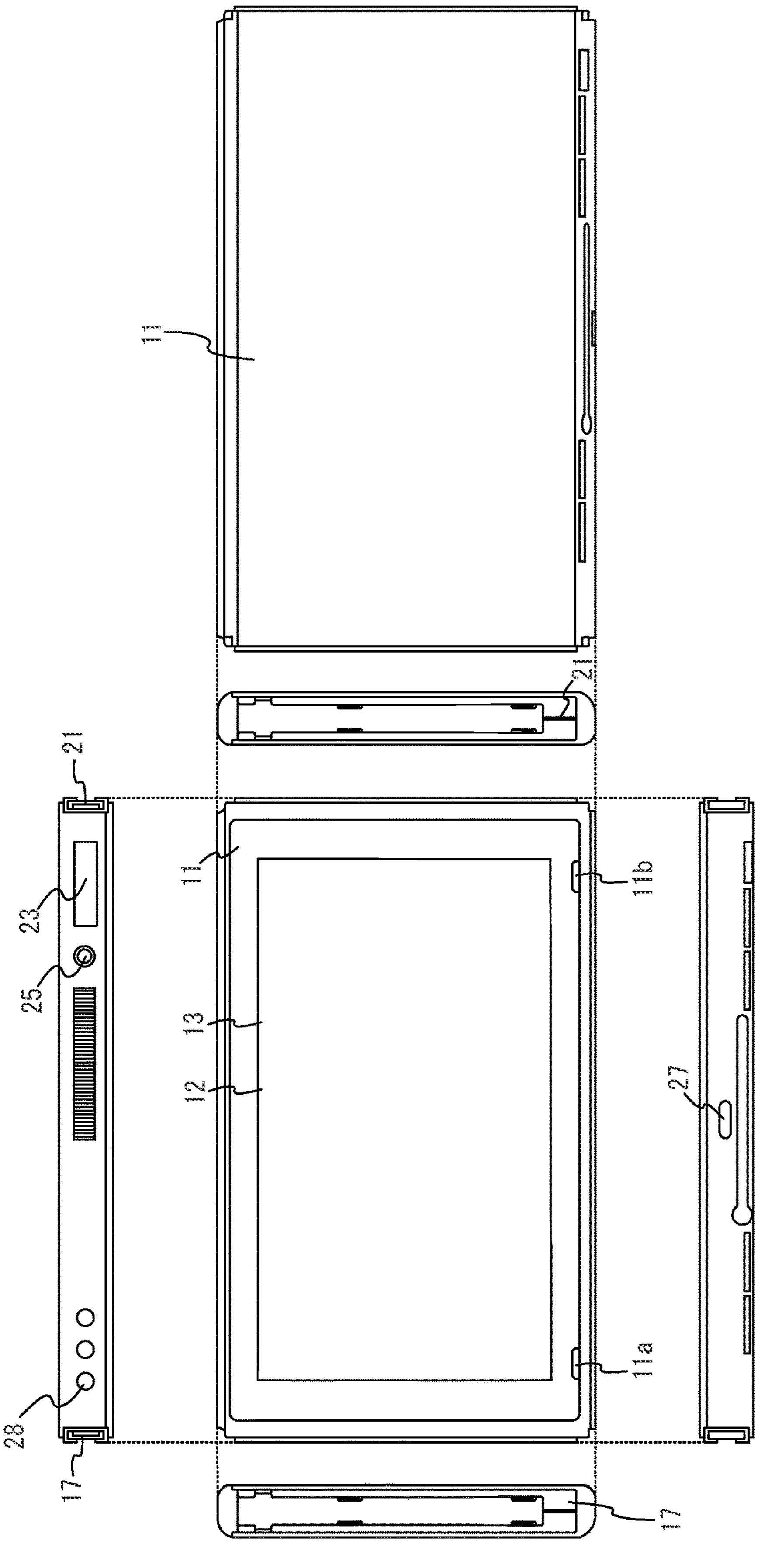
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In the first embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In the first embodiment, the display 12 is a liquid crystal display device (LCD). However, the display 12 may be an arbitrary type display.

Moreover, the main body apparatus 2 comprises a touch panel 13 on a screen of the display 12. In the first embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11b are formed on the main surface of the housing 11. Then, sounds output from the speakers 88 are emitted through the speaker holes 11*a* and 11*b*.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In the first embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in the first embodiment, the cradle has the function of charging the unified apparatus or the main body apparatus 2 alone that is put on the cradle. Moreover, the cradle has a function of a hub device (specifically, a USB hub).

Figure 4:
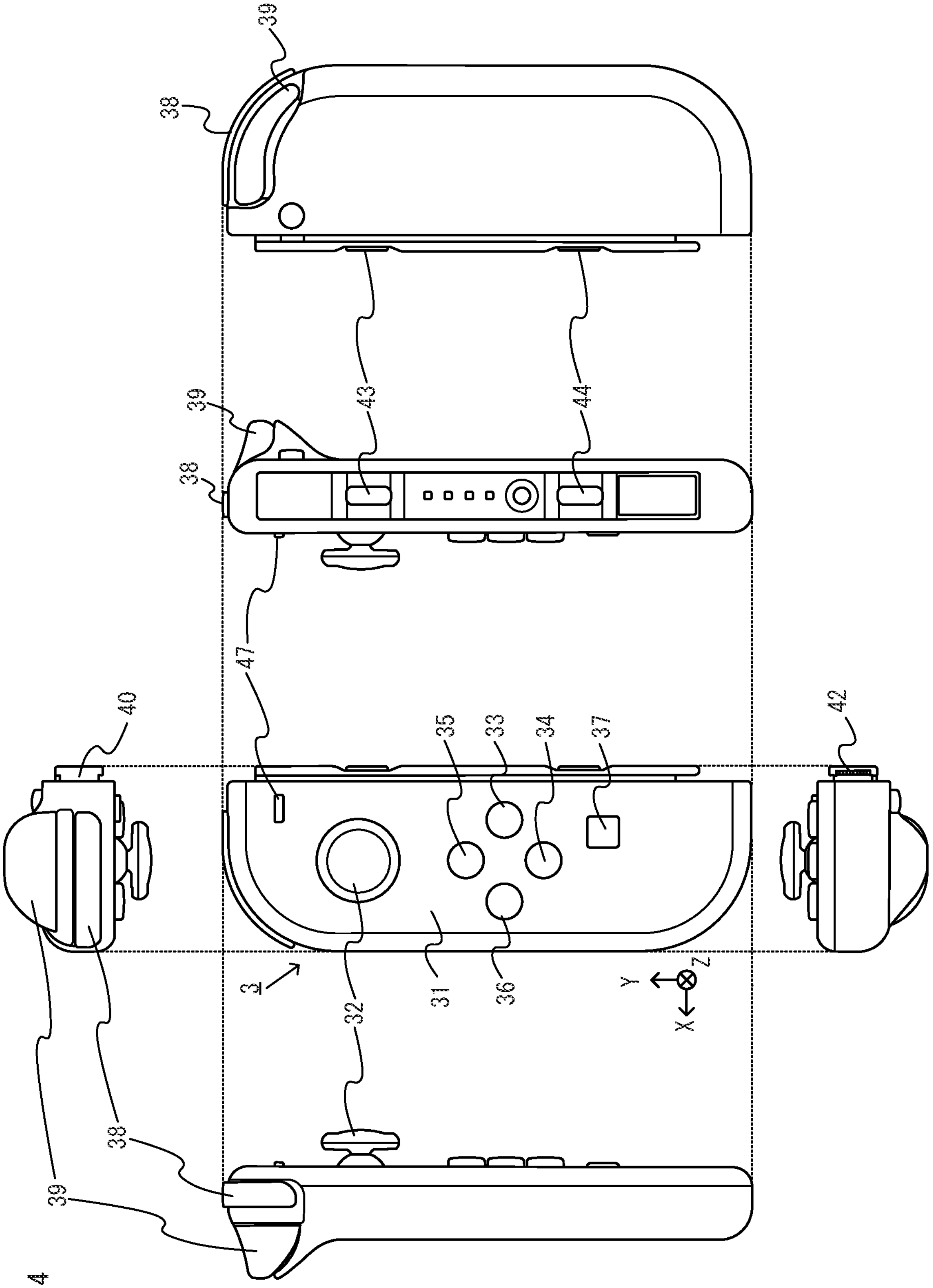
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In the first embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in the first embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Figure 5:
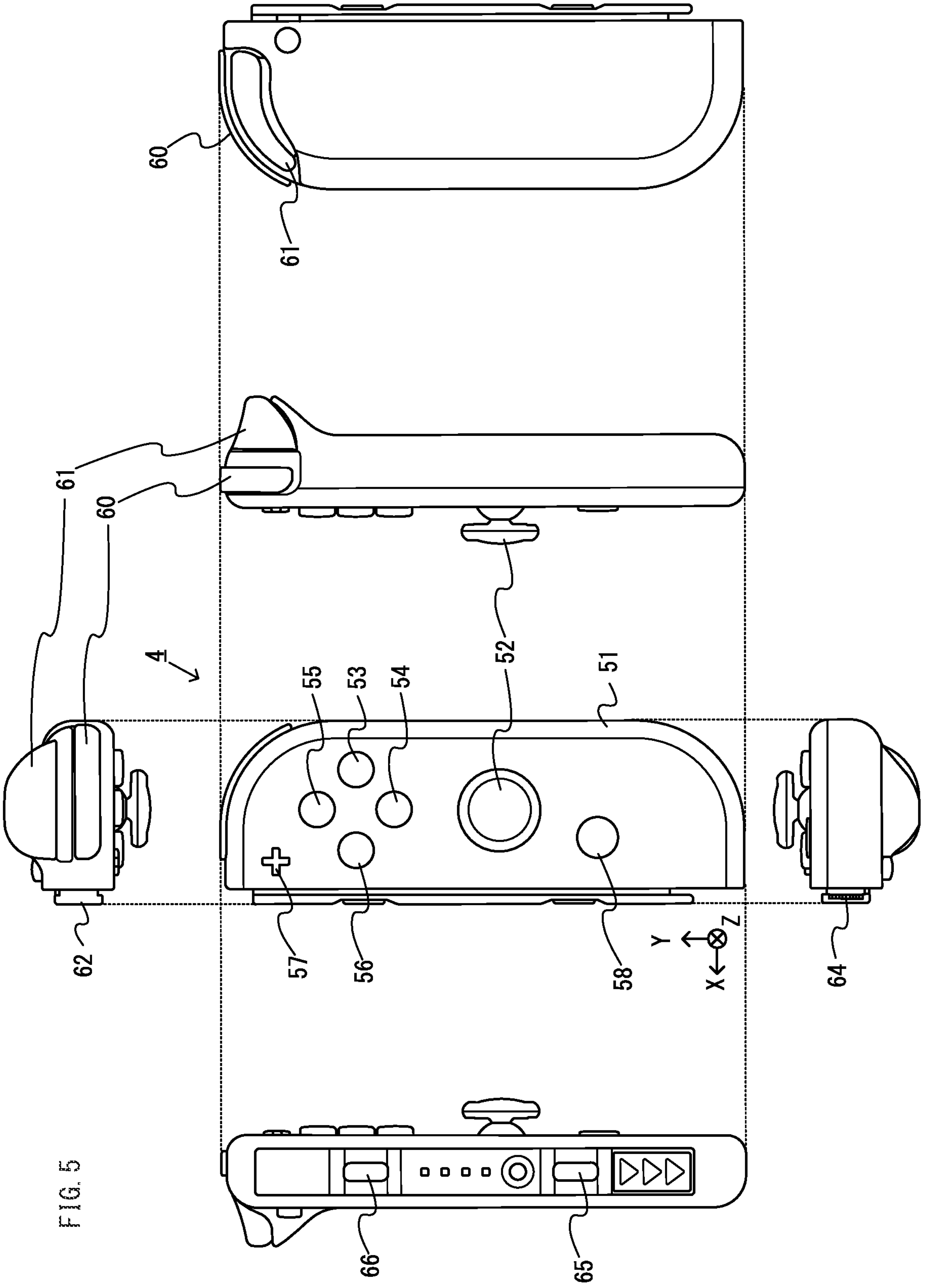
FIG. 5 is sixth orthogonal views showing a non-limiting example right controller shown in FIG. 1 and FIG. 2.

Moreover, the left controller 3 comprises a terminal 42 for the left controller 3 to perform wired communication with the main body apparatus 2. FIG. 5 is six orthogonal views showing an example of the right controller 4. As shown in FIG. 5, the right controller 4 comprises a housing 51. In the first embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In the first embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
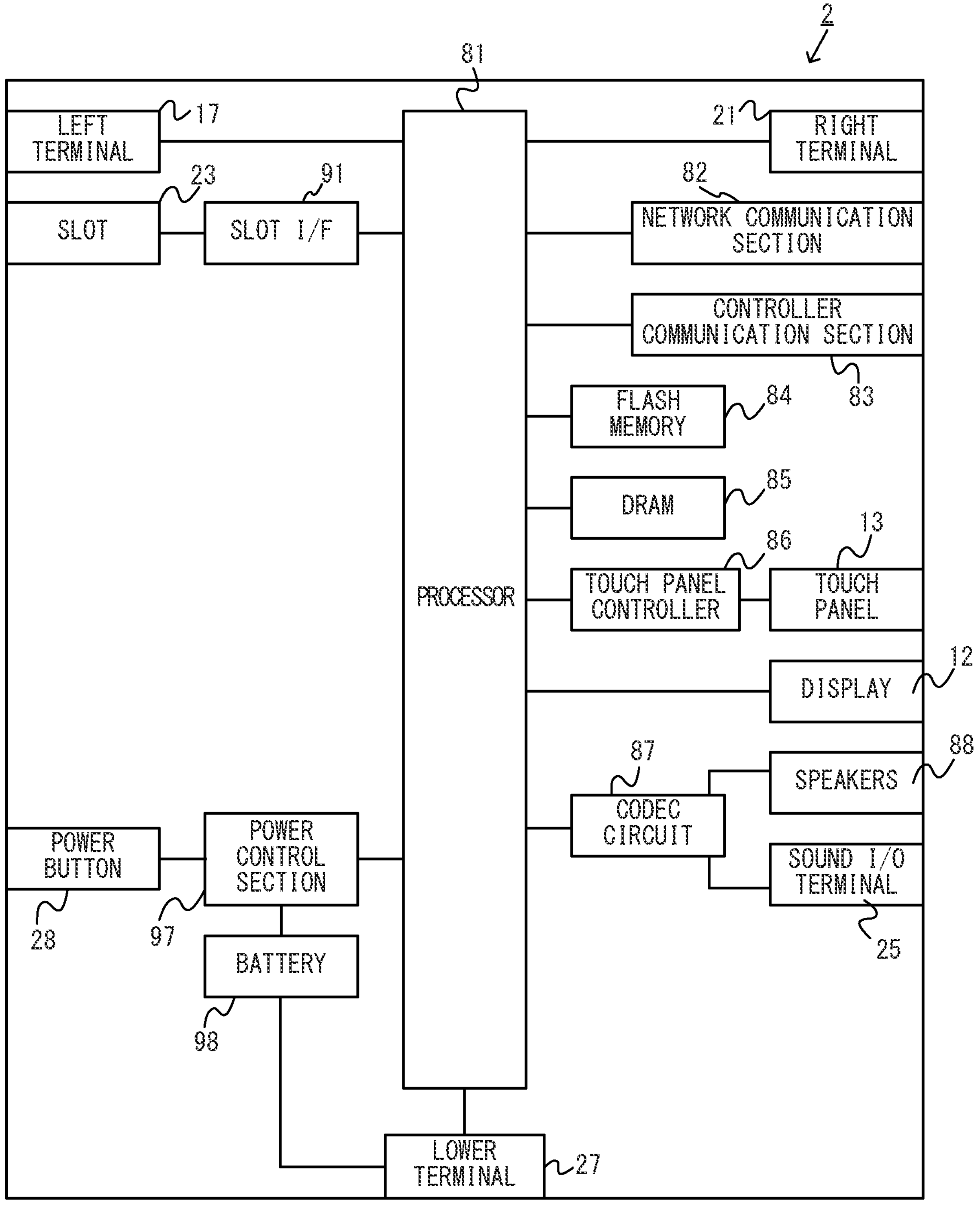
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In the first embodiment, as a first communication manner, the network communication section 82 is connected to a wireless LAN (Local Area Network) to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed LAN, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in the first embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in the first embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12. The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
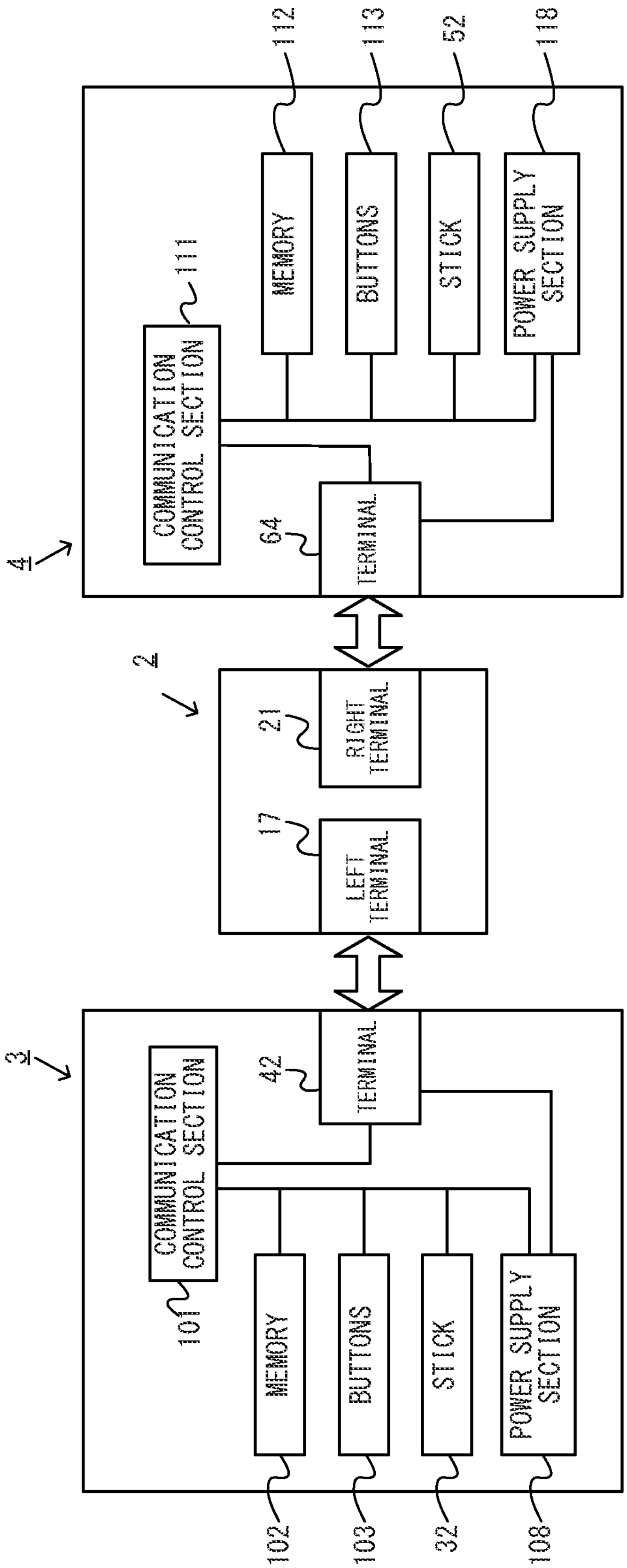
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In the first embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example. Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In the first embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
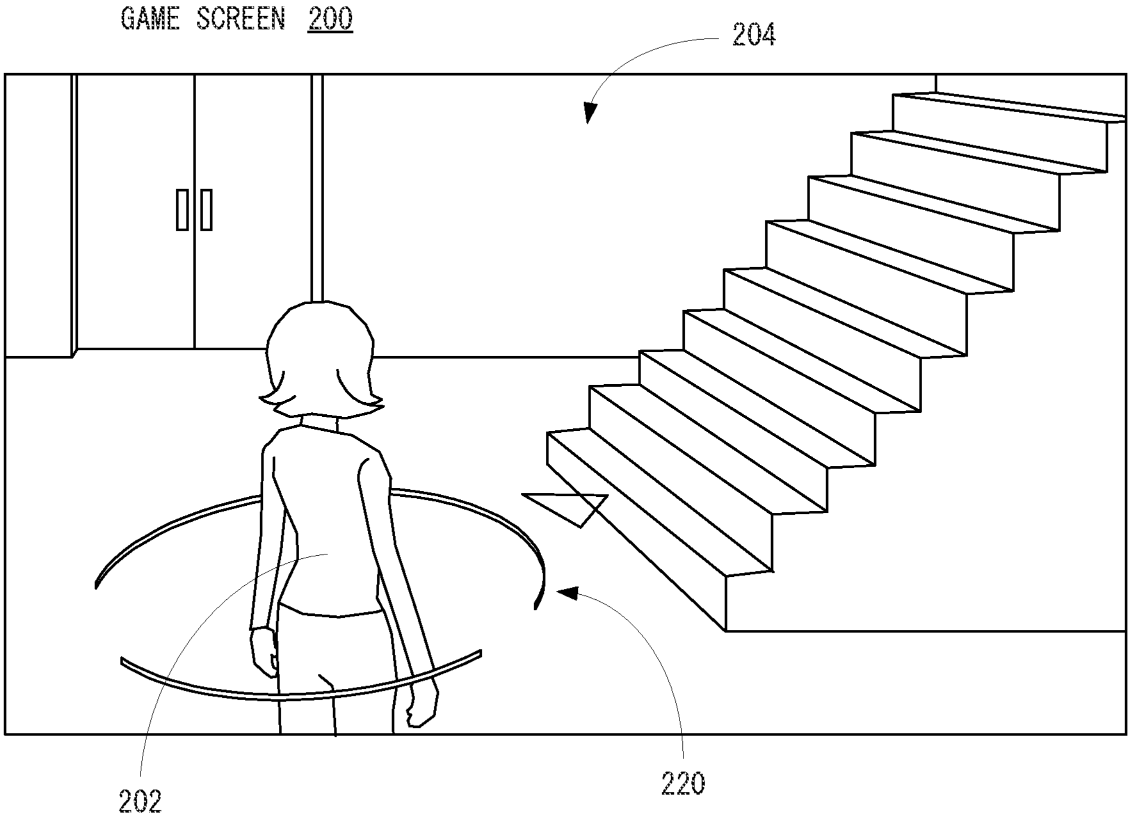
FIG. 8 is a view showing a non-limiting example game screen.

Next, with reference to FIG. 8-FIG. 17, an outline of game processing of a virtual game executed in the game system 1 of the first embodiment. FIG. 8 is a view showing a non-limiting example game image displayed on a display (e.g., the display 12) when executing an application of the virtual game of the first embodiment.

The main body apparatus 2 functions also as an image processing apparatus, and generates display image data corresponding to various screens such as a game image, and outputs (displays). The processor 81 arranges various kinds of objects and characters in a three-dimensional virtual space, thereby to generate a certain sight or situation (scene). An image that this scene is imaged by a virtual camera (viewed from a viewpoint) is displayed on the display 12 as the game image.

A game image shown in FIG. 8 is an example of a game screen 200, and the game screen 200 includes a player character 202 and a plurality of background objects 204. Moreover, an item and/or a non-player character may be included in the game screen 200.

The player character 202 is an object or character an action or operation of which is controlled by a player. In the first embodiment, the player character 202 is a main character imitating a human being. As the action or operation of the player character 202, in a certain virtual place, i.e., a virtual space, moving, acquiring an item, passing an item to a non-player character, acquiring an item from a non-player character, talking with a non-player character, etc. correspond. Moreover, in the first embodiment, the item includes various objects, such as a tool that the player character 202 or the non-player character uses or possesses, treasure, and money.

Moreover, the non-player character is an object or character an action or operation of which is controlled by a computer (processor 81 of FIG. 6), not by the player. As an example, the non-player characters include an object or character imitating a human being except the player character 202, and an object or character imitating fishes, birds and insects. As the action or operation of the non-player character, moving, acquiring an item from the player character 202, passing an item to the player character 202, being imaged by a camera that the player character 202 possesses, being caught by the player character 202, etc. correspond.

The background objects 204 include objects constituting a background, such as figurines, vehicles, terrains, etc. that are arranged in the virtual space. The figurines include signboards, plaques, stone structures, stone monuments, pots, antiques, vases, paintings, hanging scrolls, etc. The vehicles include bicycles, motorcycles, automobiles, trains, horse-drawn carriages, trolleys, ships, airplanes, etc. The terrains include ground (including roads, land, flower gardens, farmland, etc.), slopes, floors, trees, grass, flowers, buildings, stairs, bridges, rivers, ponds, holes, caves, cliffs, pillars, walls, fences, etc.

In the example shown in FIG. 8, a floor object, a wall object, a stair object and a door object are provided as the background object 204. Hereinafter, in this specification, in explaining the background object 204, i.e., the object of the figurines, the vehicles and the terrains, only a name of the figurines, the vehicles or the terrain will be described, and the word “object” will be omitted.

In the first embodiment, the player moves the player character 202 in the virtual space, for example, to advance a virtual game by executing or advancing a predetermined event. As an example, the player character 202 is moved in a direction that the analog stick 32 is tilted. Although a detailed description is omitted, by operating each button 113, the player character 202 is caused to execute an operation (but, except for movement) having been set in advance.

Moreover, in the first embodiment, the predetermined event includes arbitrary occurrences that occur during the game, and is executed (or started) by solving a trick, puzzle or riddle set in a predetermined background object 204 having been arranged in the virtual space. Specifically, the predetermined event includes occurrences, such as acquiring a predetermined item by the player character 202, obtaining a hint for solving by the player character 202 the trick or riddle, opening of a door, appearing of secret entrance or exit, stone falling, stone monument moving, moving or deforming of movable bridge, etc. When executing (or starting) such a predetermined event, a game screen 200 showing a manner that the predetermined event is advanced is displayed.

Moreover, as shown in FIG. 8, an indicating object 220 is displayed in the game screen 200 so as to surround the player character 202. The indicating object 220 is an object showing a direction that the player character 202 is to be moved.

The direction that the player character 202 is to be moved is a direction toward each mark object 210 (see FIG. 14) arranged corresponding to each of a plurality of background objects 204 to which the predetermined event is being set. However, when there are one or more waypoints to pass before reaching the mark object 210, directions toward one or more waypoints are also included in the direction that the player character 202 is to be moved.

The waypoint is a point through which the player character 202 should move until reaching the mark object 210. For example, when the mark object 210 is arranged on a floor above or below a floor that the player character 202 currently exists, since it is necessary to move to the upper floor or the lower floor with using stairs or a ladder, a point that the stairs or the ladder is placed (i.e., waypoint) is set as a target point. It is necessary for the player character 202 to go up or down the stairs or the ladder in order to move to the upper floor or the lower floor, if the player character 202 arrives at the point that the stairs or the ladder is placed, a point at which the stairs or the ladder is ascended or descended (i.e., waypoint) is set as a target point.

Moreover, when the mark object 210 is arranged on an opposite shore of the player character 202, since it is necessary for the player character 202 to over a bridge or to move with a boat in order to cross a river, a point that the bridge or a port is located (i.e., waypoint) is set as a target point. Moreover, it is necessary for the player character 202 to over a bridge or to move with a boat in order to cross the river, if arriving at the point that the bridge or the port is located, a certain place on the opposite shore (i.e., waypoint) is then set as a target point.

In addition, these are examples and one or more waypoints are suitably set according to a place where the mark object 210 is located.

In order to cause the player to sequentially move the player character 202 to arrangement positions of the one or more waypoints and respective mark objects 210, such arrangement positions of the respective waypoints and the respective mark objects 210 are sequentially set as the target points, respectively and each of the respective target points is sequentially indicated by the indicating object 220.

In a case where a current target point is an arrangement position of the mark object 210, when the player or the player character 202 solves the trick, puzzle or riddle having been set to the background object 204 corresponding to the mark object 210, the predetermined event is advanced, and if the predetermined event is ended, a next target point is set as the current target point.

Moreover, in a case where the current target point is the waypoint, if the player character 202 passes through the current target point in a direction that the player character is to be moved (hereinafter, referred to as “forward direction”), a next target point is set as the current target point. However, when the player character 202 passes in a reverse direction the waypoint that the player character 202 has once passed in the forward direction, the waypoint concerned is again set as the current target point.

Figure 9A:
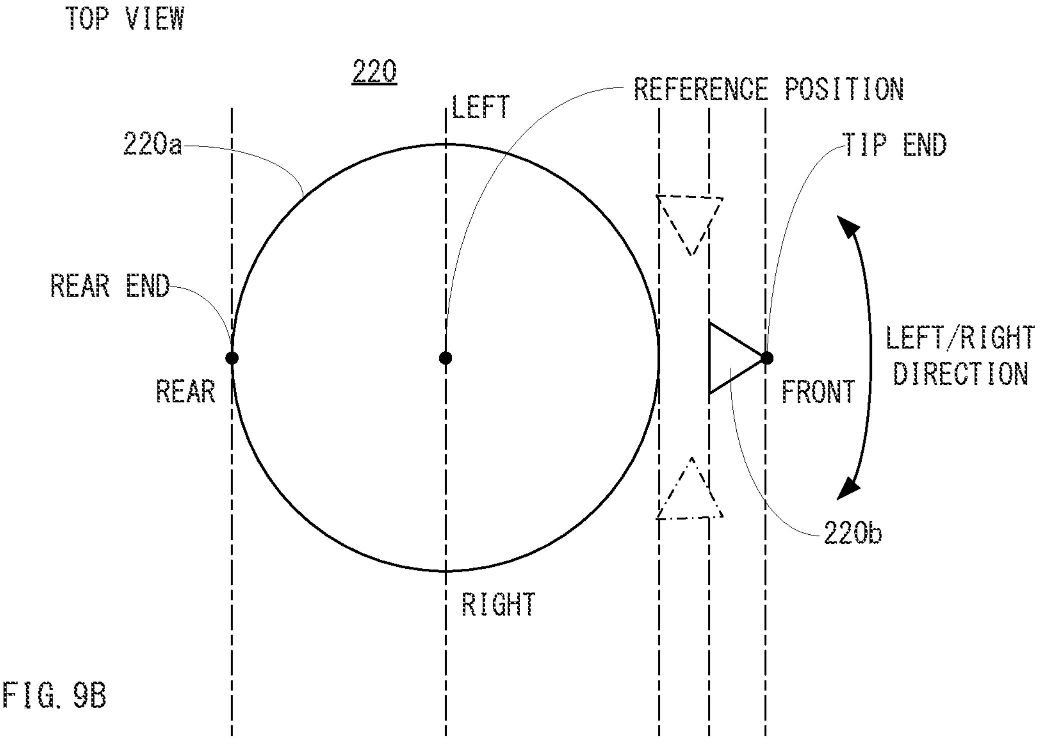
FIG. 9A is a top view showing a non-limiting example indicating object of a first embodiment viewed from above.
Figure 9B:
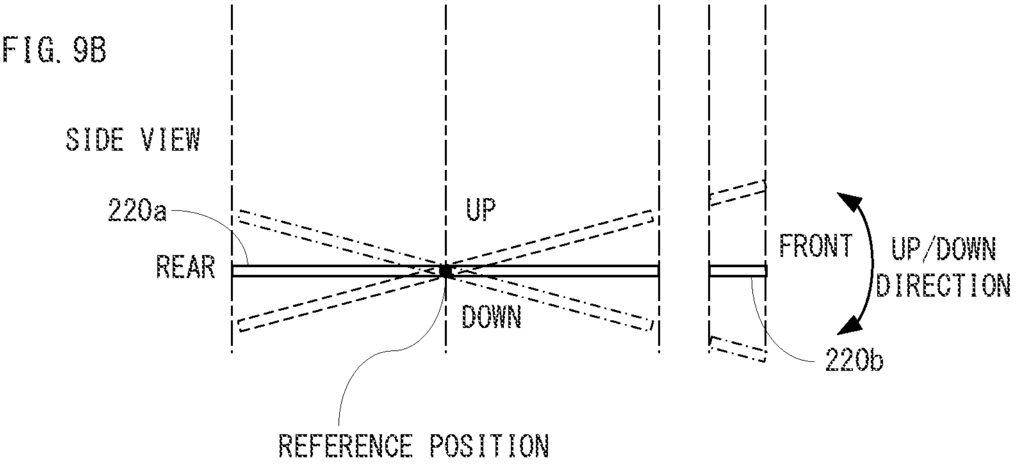
FIG. 9B is a side view showing the non-limiting example indicating object of the first embodiment viewed from side.
Figure 10A:
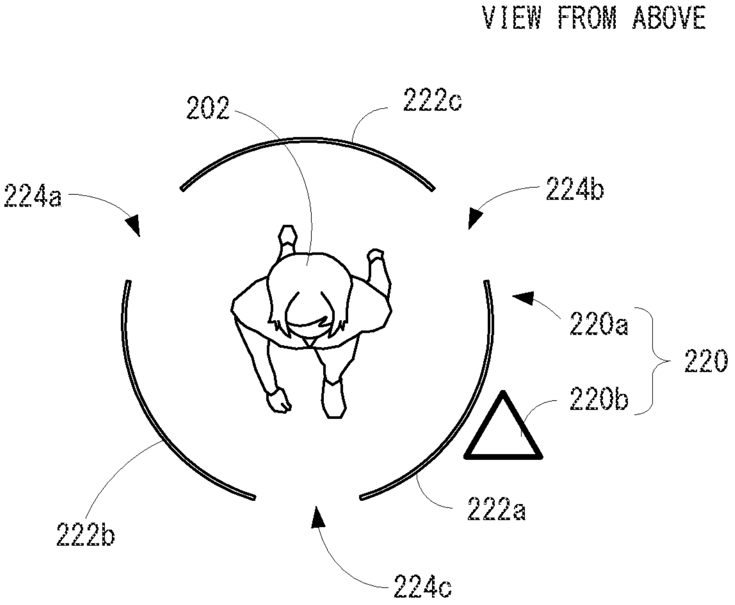
FIG. 10A is a view showing a non-limiting example relationship between a player character and an indicating object that are displayed in a game screen viewed from right above.
Figure 10B:
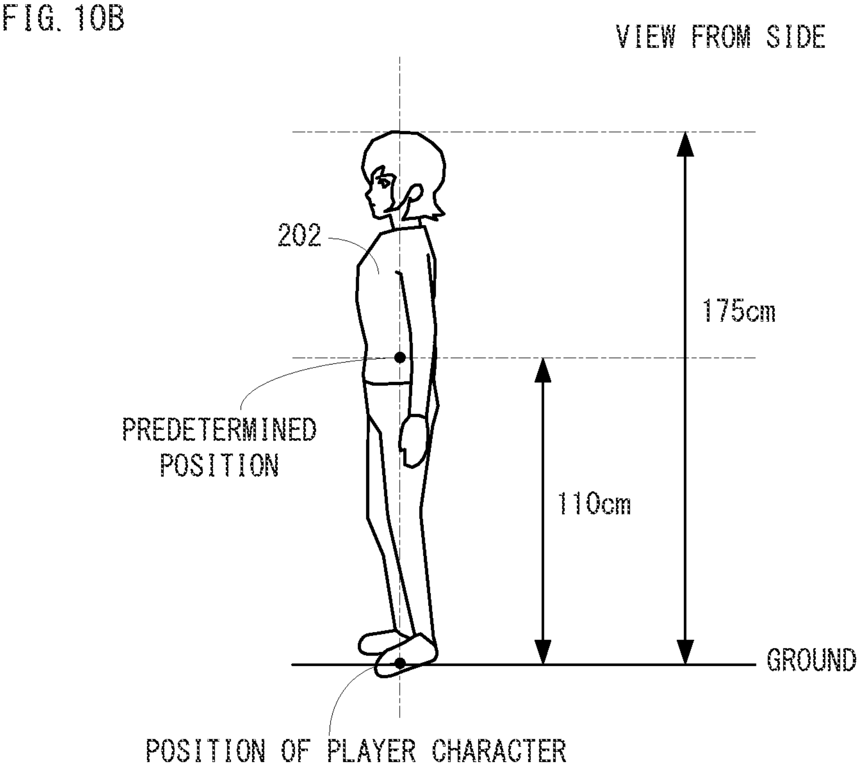
FIG. 10B is a view showing the non-limiting example relationship between the player character and the indicating object that are displayed in the game screen viewed from side.

FIG. 9A is a view showing a non-limiting example indicating object 220 viewed from right above, and FIG. 9B is a view showing the non-limiting example indicating object 220 viewed from just side. FIG. 10A is a view showing a non-limiting example relationship between the player character 202 and the indicating object 220 displayed in the game screen 200 viewed from right above, and FIG. 10B is a view showing a non-limiting example player character 202 displayed in the game screen 200 viewed from side. With reference to FIG. 9A, FIG. 9B, FIG. 10A and FIG. 10B, the indicating object 220 will be described.

The indicating object 220 is set to a predetermined size, and includes a first direction indicating portion 220*a* and a second direction indicating portion 220*b*, and the first direction indicating portion 220*a* and the second direction indicating portion 220*b* are arranged on a straight line (see FIG. 9B). A direction of the indicating object 220 is a direction toward the first direction indicating portion 220*a* from the second direction indicating portion 220*b*.

Moreover, in the first embodiment, the indicating object 220 is arranged so that a reference position of the indicating object 220 overlaps with a predetermined position of the player character 202 (e.g., a center position of the torso at the height of the waist). Moreover, the reference position of the indicating object 220 is set to a center position of the first direction indicating object portion 220*a*, as an example. Moreover, the predetermined position of the player character 202 is a position that is moved in parallel to the height of the waist from the position of the player character 202. However, this is an example, the predetermined position may be a center position of the head of the player character 202. The position of the player character 202 is a position that the player character 202 contacts the floor or the ground in the virtual space (e.g., foot position). As an example, a height of the player character 202 (i.e., stature) is set as one-hundred and seventy-five (175) centimeters in the virtual space, and a height of the waist is set as one-hundred and ten (110) centimeters from the foot position.

Therefore, the indicating object 220 is arranged within a predetermined range on the basis of the position of the player character 202. As an example, if assuming that a length from the reference position of the indicating object 220 to a tip end thereof is set as one-hundred (100) centimeters in the virtual space, the indicating object 220 will be arranged in one-hundred (100) centimeters in radius centering on the predetermined position of the player character 202. However, the tip end of the indicating object 220 is an end of the second direction indicating portion 220*b* in a longitudinal direction of the indicating object 220. Moreover, a rear end of the indicating object 220 is an end of an opposite side to the tip end in the longitudinal direction of the indicating object 220.

The first direction indicating portion 220*a* is a circular-ring-shape or a cylindrical shape surrounding the player character 202. However, the first direction indicating portion 220*a* is visible to be divided (discontinuity) because of being partly colored with a transparent object and partly not colored. In the first direction indicating portion 220*a* of the first embodiment, the number of colored portions is three (3) and the number of non-colored portions is three (3). Each of the colored portions and the non-colored portions is circular arc, and as for example, a length of the colored portion is made to be longer than a length of the non-colored portion (approximately, three (3) times).

Specifically, as shown in FIG. 10A, portions being colored out of the first direction indicating portions 220*a* are a colored portion 222*a* (corresponding to "first portion") on a side that the second direction indicating portion 220*b* is provided, and colored portions 222*b* and 222*c* that are displaced from the colored portion 222*a* by one-hundred and twenty (120) degrees clockwise and counterclockwise, respectively. Moreover, portions being not colored out of the first direction indicating portions 220*a* are a non-colored portion 224*a* (corresponding to "second portion") located on a side opposite to the colored portion 222*a* across the reference position (or player character 202), and non-colored portions 224*b* and 224*c* that are displaced from the non-colored portion 224*a* by one-hundred and twenty (120) degrees clockwise and counterclockwise, respectively. That is, the non-colored portion 224*b* is located on an opposite side to the colored portion 222*b* across the reference position (or player character 202), and the non-colored portion 224*c* is located on an opposite side to the colored portion 222*c* across the reference position (or player character 202).

In addition, although the non-colored portions 224*a*, 224*b* and 224*c* that the first direction indicating portion 220*a* are not partly colored are provided in the first embodiment, portions corresponding to the non-colored portions 224*a*, 224*b* and 224*c* may be deleted from the first direction indicating portion 220*a*. That is, the first direction indicating portion 220*a* may be constructed with three (3) circular-arc objects (i.e., the colored portion 222*a*, 222*b* and 222*c*) arranged in a circular-ring-shape or in a cylindrical shape.

Moreover, instead of distinguishing portions by presence or absence of coloring, the portions may be distinguished by the differences in shape. For example, the portions (222*a*, 222*b* and 222*c*) and the portions (224*a*, 224*b* and 224*c*) may be distinguished from each other by drawing with solid lines and dotted lines that are colored with the same color.

Figure 14:
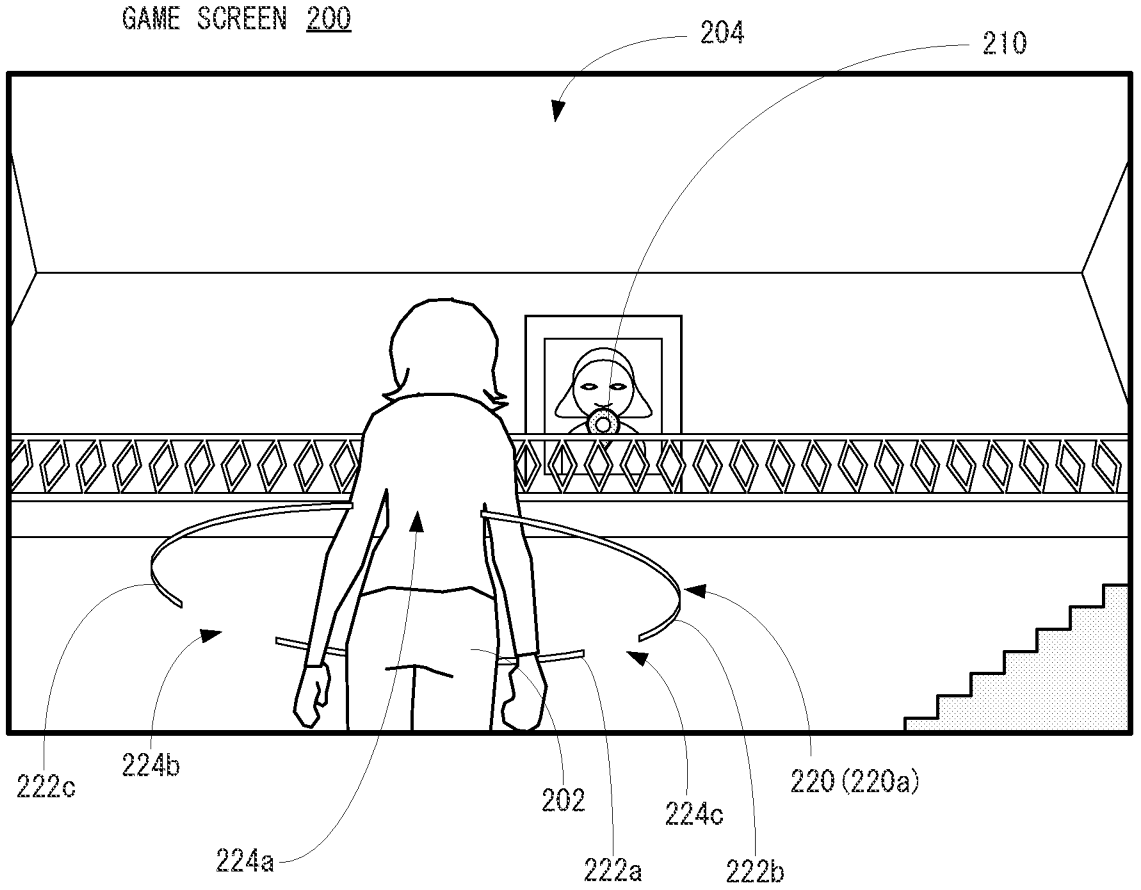
FIG. 14 is a view showing another non-limiting example game screen.

A reason why the non-colored portions 224*a*, 224*b* and 224*c* are provided in the first direction indicating portion 220*a* is that it is to know a horizontal direction indicating the target point even if the second direction indicating portion 220*b* is hidden behind the player character 202 and thus cannot be seen (see FIG. 14). Since the non-colored portion 224*a* is formed in an opposite side to the colored portion 222*a* as described above, it is possible to know that a horizontal component of a direction toward an opposite side of the non-colored portion 224*a* from the non-colored portion 224*a* in the first direction indicating portion 220*a* is a horizontal direction that indicates the target point through confirmation of the non-colored portion 224*a* based on the non-colored portions 224*a*, 224*b* and 224*c*.

In addition, since there is no occasion that the second direction indicating portion 220*b* and the non-colored portion 224*a* are both hidden behind the player character 202, the non-colored portion 224*b* and the non-colored portion 224*c* may be omitted. That is, only the non-colored portion 224*a* may be provided in the first direction indicating portion 220*a*.

Moreover, a shape of the first direction indicating portion 220*a* may be a regular polygon or a circular shape that is formed with a plurality of spheres, a plurality of circles or a plurality of cylinders. Furthermore, when the regular polygon is an equilateral triangle, it is possible to omit the second direction indicating portion 220*b* if drawing vertices to be identifiable. As an example, a vertex or a portion containing the vertex may be colored with a color different from other portions, or a portion of an opposite (bottom) side to a vertex may not be colored, or a portion of the opposite side may be removed. However, a part of the opposite side to the vertex is a portion that includes a point where a straight line perpendicular from the vertex to the opposite side intersects the opposite side.

The second direction indicating portion 220*b* is a triangular object that is provided in the same plane as the first direction indicating portion 220*a* to be separated from the first direction indicating portion 220*a* with a predetermined interval. However, the indicating object 220, i.e., the second direction indicating portion 220*b* may be made with rounded vertices. Otherwise, the second direction indicating portion 220*b* may be in a shape that a plurality of triangles are superimposed with a slight shift in a width direction of the indicating object 220. In such a case, the vertices of the second direction indicating object 220*b* are jagged. However, the width direction of the indicating object 220 is in the same plane as those of the first direction indicating portion 220*a* and the second direction indicating portion 220*b*, and is a direction perpendicular to a direction indicated by the indicating object 220.

In addition, in the first embodiment, although the second direction indicating portion 220*b* is provided separately from the first direction indicating portion 220*a* with a predetermined interval, in other examples, the second direction indication portion 220*b* may be provided to be brought into contact to the first direction indicating portion 220*a* at an inner side or an outer side, or may be provided to be superposed with the first direction indication portion 220*a*. Moreover, a shape of the second direction indicating portion 220*b* may be a shape of an arrow.

As described above, the indicating object 220 indicates or points a direction to the target point. An orientation of the indicating object 220 is a direction toward the colored portion 222*a* from the non-colored portion 224*a*. Moreover, in other word, the orientation of the indicating object 220 is a direction toward the second direction indicating portion 220*b* from the first direction indicating portion 220*a*. Therefore, in the first direction indicating portion 220*a*, the colored portions 222*a* sandwiches the player character 202, and is arranged on a side closer to the target point than the non-colored portion 224*a*. That is, the colored portions 222*a* is arranged in a position closer to the target point than the player character 202, and the non-colored portion 224*a* is arranged in a position further to the target point than the player character 202. Moreover, the second direction indicating portion 220*b* is arranged on a side closer to the target point than the first direction indicating portion 220*a*.

Moreover, the indicating object 220 is displayed so as to linearly indicate a direction to the target point on the basis of the center (central point) of the first direction indicating portion 220*a*. That is, the indicating object 220 rotates (or turns) within a plane parallel to a horizontal plane centering on the reference position, and rotates or turns in a direction perpendicular to the horizontal plane centering on the reference position. Therefore, the horizontal component of the direction of the indicating object 220 is a horizontal direction to the target point. Moreover, an angle that is formed by a direction of the indicating object 220 and the horizontal plane is a depression angle or an elevation angle when viewing the target point from a predetermined position. That is, the lean of the indicating object 220 expresses the height of the target point with respect to the predetermined position.

Specifically, as shown in FIG. 9A, the indicating object 220, i.e., the first direction indication portion 220*a* and the second direction indicating portion 220*b* may be rotated or tuned in a left/right direction centering on the reference position when viewing from right above. In an example shown in FIG. 9A, on the assumption that the indicating object 220 facing right on the drawing is a reference, the second direction indicating portion 220*b* of the indicating object 220 when rotated or turned by thirty (30) degrees leftward (i.e., counterclockwise) centering on the reference position is drawn by a dotted line, and the second direction indicating portion 220*b* of the indicating object 220 when rotated or turned by thirty (30) degrees rightward (i.e., clockwise) centering on the reference position is drawn by a one-dotted line.

Moreover, as shown in FIG. 9B, the indicating object 220, i.e., the first direction indicating portion 220*a* and the second direction indicating portion 220*b* may be rotated or turned in an upper/down direction centering on the reference position when viewing from just side. In an example shown in FIG. 9B, on the assumption that the indicating object 220 facing right on the drawing is a reference, the indicating object 220 when rotated or turned by thirty (30) degrees upward centering on the reference position is drawn by a dotted line, and the indicating object 220 when rotated or turned by thirty (30) degrees downward centering on the reference position is drawn by a one-dotted line.

It is possible for the player to know the horizontal direction of the target point by the orientation of the indicating object 220 (or second direction indicating portion 220*b*), and to know the height of the target point respect to the predetermined position of the player character 202 by the lean of the indicating object 220 (or the first direction indicating portion 220*a*).

That is, a direction toward the target point from the predetermined position of the player character 202 (three-dimensional direction, the same applies hereinafter) is calculated, and the indicating object 220 is arranged in the virtual space so as to face the calculated direction. The indicating object 220 is arranged so that the horizontal component of the orientation thereof may be corresponding to the horizontal component of the calculated direction, and the height at the tip end of the indicating object 220 is determined based on a vertical component of the calculated direction. As shown in FIG. 9A, the tip end of the indicating object 220 is an end of the second direction indicating portion 220*b* in the longitudinal directions of the indicating object 220, and, more specifically, the tip end is one vertex indicating the direction of the indicating object 220 out of three (3) vertices of the second direction indicating portion 220*b* in a triangular shape.

In the first embodiment, in order to determine the height of the tip end of the indicating object 220, an angle that the indicating object 220 is to be leaned is calculated. Since the three-dimensional coordinates of the predetermined position and the target point are known, a direct distance, a horizontal distance and a vertical distance between the predetermined position and the target point are calculable. Therefore, it is possible to calculate, using trigonometric functions, an angle formed by a direction toward the target point from the predetermined position with a horizontal plane, i.e., the angle that the indicating object 220 is to be leaned.

However, the predetermined position is calculable based on the current position of the player character 202. The current position of the player character 202 is basically changed according to an operation of the player. When a predetermined event is executed in a virtual game, the position of the player character 202 may be forcibly changed by a computer (i.e., processor 81).

Figure 11:
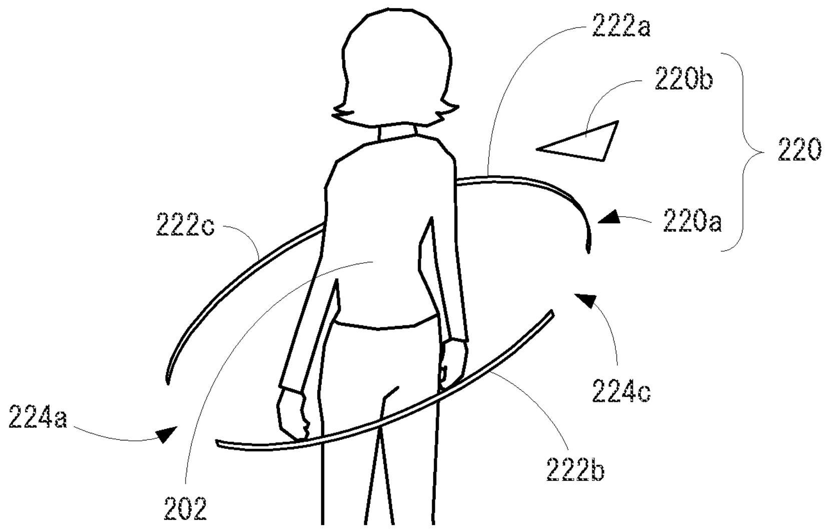
FIG. 11 is a view showing another non-limiting example relationship between the player character and the indicating object that are displayed in the game screen.
Figure 12:
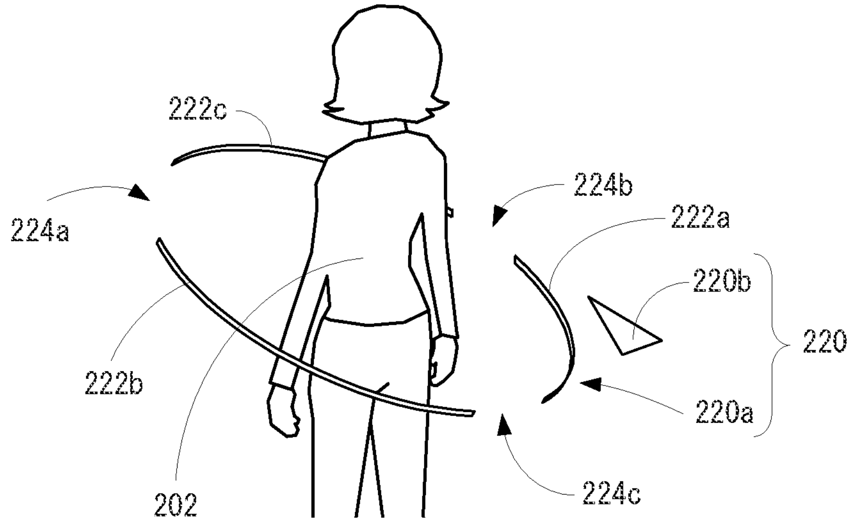
FIG. 12 is a view showing a further non-limiting example relationship between the player character and the indicating object that are displayed in the game screen.

FIG. 11 is a view showing a non-limiting example indicating object when the target point in a position higher than the predetermined position of the player character 202 is indicated. FIG. 12 is a view showing a non-limiting example indicating object when the target point in a position lower than the predetermined position of the player character 202 is indicated.

As shown in FIG. 11 and FIG. 12, the orientation of the indicating object 220 indicates a direction toward the target point from the predetermined position. Therefore, as shown in FIG. 11, when the target point is above the predetermined position, the indicating object 220 is leaned upward so that the tip end of the second direction indicating portion 220*b* indicates the target point. That is, the tip end of the indicating object 220 becomes in a position higher than a rear end of the indicating object 220. As a matter of course, in this case, the colored portion 222*a* becomes in a position higher than the non-colored portion 224*a*. In this case, since the first direction indicating portion 220*a* and the second direction indicating portion 220*b* are arranged on a straight line, the first direction indicating portion 220*a* is leaned upward so that a direction that tends toward a point closest to the second direction indicating portion 220*b* out of the colored portions 222*a* from the center position of the first direction indicating portion 220*a* may indicate the target point.

Moreover, as shown in FIG. 12, when the target point is below the predetermined position, the indicating object 220 is leaned downward so that the tip end of the second direction indicating portion 220*b* indicates the target point. That is, the tip end of the indicating object 220 becomes in a position lower than the rear end of the indicating object 220. As a matter of course, in this case, the colored portion 222*a* becomes in a position lower than the non-colored portion 224*a*. In this case, the first direction indicating portion 220*a* is leaned downward so that a direction that tends toward a point closest to the second direction indicating portion 220*b* out of the colored portions 222*a* from the center position of the first direction indicating portion 220*a* may indicate the target point.

When the lean in the up/down direction of the indicating object 220 is thus changed (or updated), a point closest to the second direction indicating portions 220*b* out of the colored portions 222*a* in the indicating portion 220, i.e., a height of an end portion on a side of the target point in the first direction indicating portion 220*a* is changed (or updated).

In addition, although illustration is omitted, when the orientation of the upward and downward of the indicating object 220 is changed, the indicating object 220 is gradually leaned for each frame. However, a single frame is a unit time of updating the screen, and is one thirtieth (1/30) seconds, one sixtieth (1/60), or one one-hundred-twentieth (1/120) seconds.

Figure 13A:
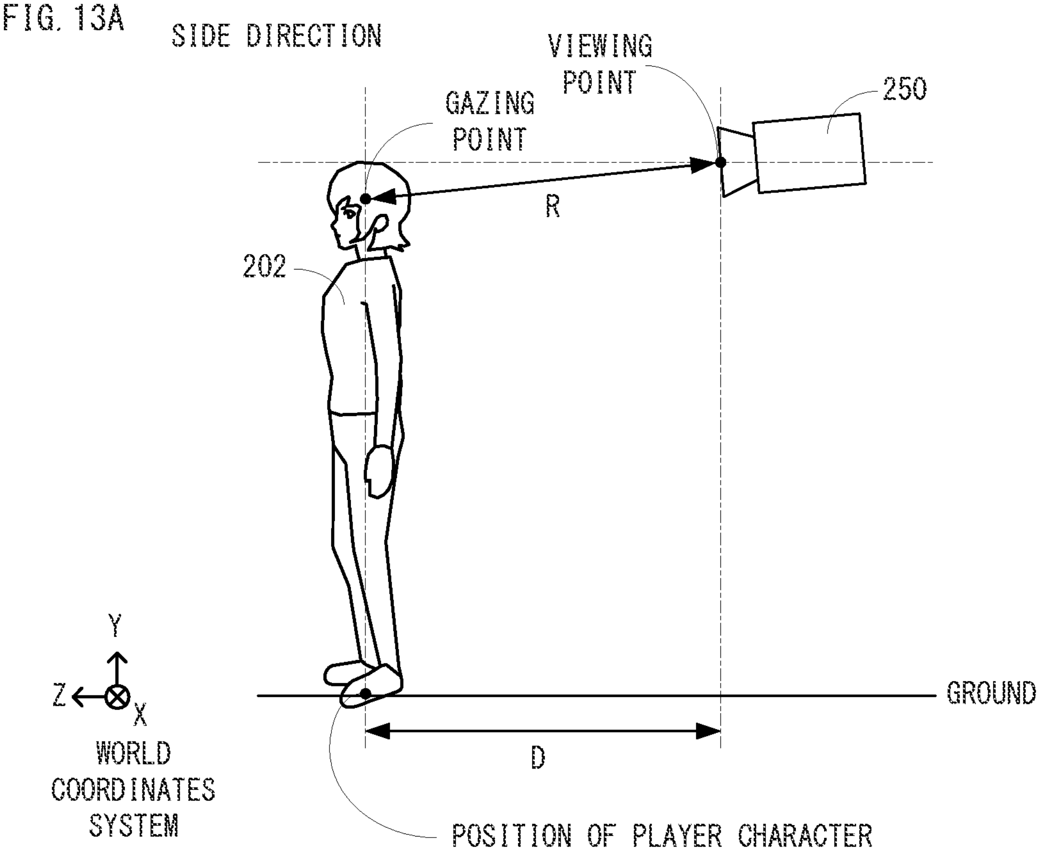
FIG. 13A is a view showing a non-limiting example relationship between the player character and a virtual camera in a virtual space viewed from side.
Figure 13B:
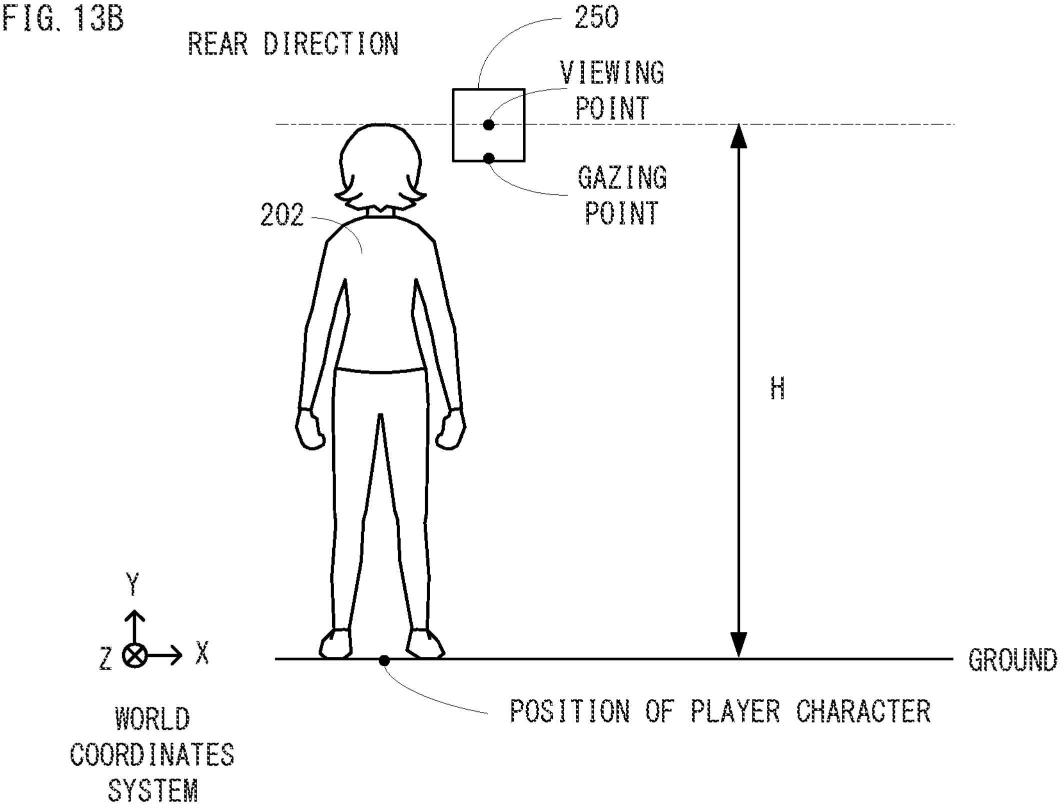
FIG. 13B is a view showing the non-limiting example relationship between the player character and the virtual camera in the virtual space viewed from rear.

Moreover, it is possible for the player to control the virtual camera 250 to move and zoom the virtual camera 250. As an example, the virtual camera 250 is moved in a direction that the analog stick 52 is tilted, zoomed in with the L button 38, and zoomed out with the R button 60. FIG. 13A is a view showing a non-limiting example relationship between the player character 202 and the virtual camera 250 in the virtual space viewed from side. FIG. 13B is a view showing the non-limiting example relationship between the player character 202 and the virtual camera 250 in the virtual space viewed from rear.

As shown in FIG. 13A and FIG. 13B, the world coordinate system is set in the virtual space, and a horizontal plane including an X axis and a Z axis or a plane parallel to the horizontal plane is an X-Z plane, a Y axis is perpendicularly set to the X axis and the Z axis (i.e., X-Z plane).

In the beginning of the virtual game started (i.e., an initial state), the virtual camera 250 is arranged behind the player character 202 in the virtual space. Specifically, the virtual camera 250 is arranged in a position that a horizontal distance with the player character 202 is D and a height from the foot position of the player character 202 is H. Moreover, an orientation of the virtual camera 250 is set so as to view a position at a slightly right side of the head of the player character 202 (i.e., gazing point) in a bird's-eye view. If the player does not move the virtual camera 250, the virtual camera 250 follows the player character 202 while maintaining such a positional relationship. However, the foot position of the player character 202 is a position of the player character 202.

When the player moves the virtual camera 250, the position and the orientation of the virtual camera 250 are changed so that the virtual camera 250 faces the gazing point while maintaining the distance R between the position of the virtual camera 250 and the gazing point. That is, the virtual camera 250 is moved on a spherical surface having a radius of the distance R centering on the gazing point. However, such a movement of the virtual camera 250 is restricted if the virtual camera 250 penetrates or is buried in the background object 204, such as the ground, floor, wall, pillar, etc. This is the same when zooming the virtual camera 250.

When the player zooms in the virtual camera 250, the virtual camera 250 is moved in a direction approaching the gazing point, and when zooms out, the virtual camera 250 is moved in a direction away from the gazing point. That is, if the zoom of the virtual camera 250 is performed, the distance R will be changed.

When the player moves the virtual camera 250, a positional relationship with the player character 202 is changed, and the virtual camera 250 follows the player character 202 while maintaining the changed positional relationship.

In addition, if the player resets the position and the orientation of the virtual camera 250, the position and the orientation of the virtual camera 250 with respect to the player character 202 are returned to the initial state.

FIG. 14 is a view showing another non-limiting example game screen 200 displayed on the display. The game screen 200 shown in FIG. 14 is displayed when the player character 202 is moved to the front and the virtual camera 250 is moved below than a case where the game screen 200 shown in FIG. 8 is displayed. The second direction indicating portion 220*b* is hidden behind the player character 202 in the game screen 200 shown in FIG. 14. However, since the non-colored portion 224*a* of the first direction indicating portion 220*a* is visible by the player, it is possible for the player to recognize that the second direction indicating portion 220*b* is arranged in the opposite side to the non-colored portion 224*a* beyond the player character 202.

As shown in FIG. 14, the mark object 210 is arranged in the background object 204 to which the predetermined event is set. However, as shown in FIG. 8 and FIG. 14, the indicating object 220 indicates the stairs arranged diagonally forward to the right of the player character 202 without indicating the mark object 210. This is because the player character 202 needs to move to one floor above via the stairs before reaching the mark object 210. That is, the target point that is the waypoint is set to an entrance of the stairs.

Moreover, since it is necessary to climb the stairs, the target point is set also to a point that the stairs has been climbed. Therefore, if the player character 202 arrives at the target point set to the entrance of stairs, the indicating object 220 moved diagonally upward so as to indicate the target point set to the point that the stairs has been climbed.

It is determined, by a flag (hereinafter, "passage flag") set corresponding to each target point, whether the player character 202 has passed through the target point that is the waypoint. The passage flag is turned on when the player character 202 passes through the target point that is the waypoint in a forward direction. On the other hand, the passage flag is turned off when the player character 202 passes through the target point that is the waypoint in a reverse direction. By thus turning on or turning off the passage flag, after the player character 202 has passed once the waypoint in the forward direction, before reaching the target point to which the predetermined event is set, if passing through the same waypoint in the reverse direction, it is possible to indicate the target point that is the same waypoint by the indicating object 220 again.

Figure 15:
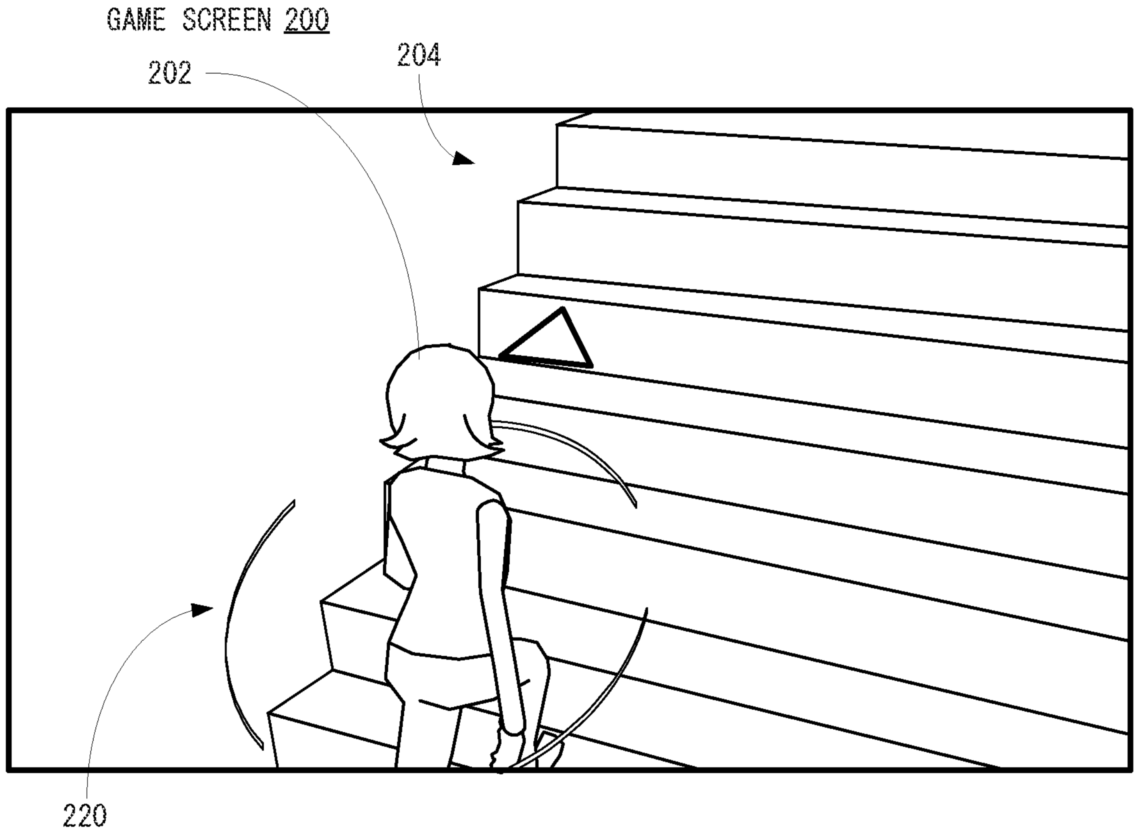
FIG. 15 is a view showing a further non-limiting example game screen.

FIG. 15 is a view showing another non-limiting example game screen 200 displayed on the display. As shown in FIG. 15, when the player character 202 exists on the stairs, the target point that is the waypoint is set to a point that the stairs has been climbed is indicated by the indicating object 220. In this case, the indicating object 220 is arranged so that the orientation thereof is turned upward because the target point is in the position higher than the predetermined position set to the player character 202.

Figure 16:
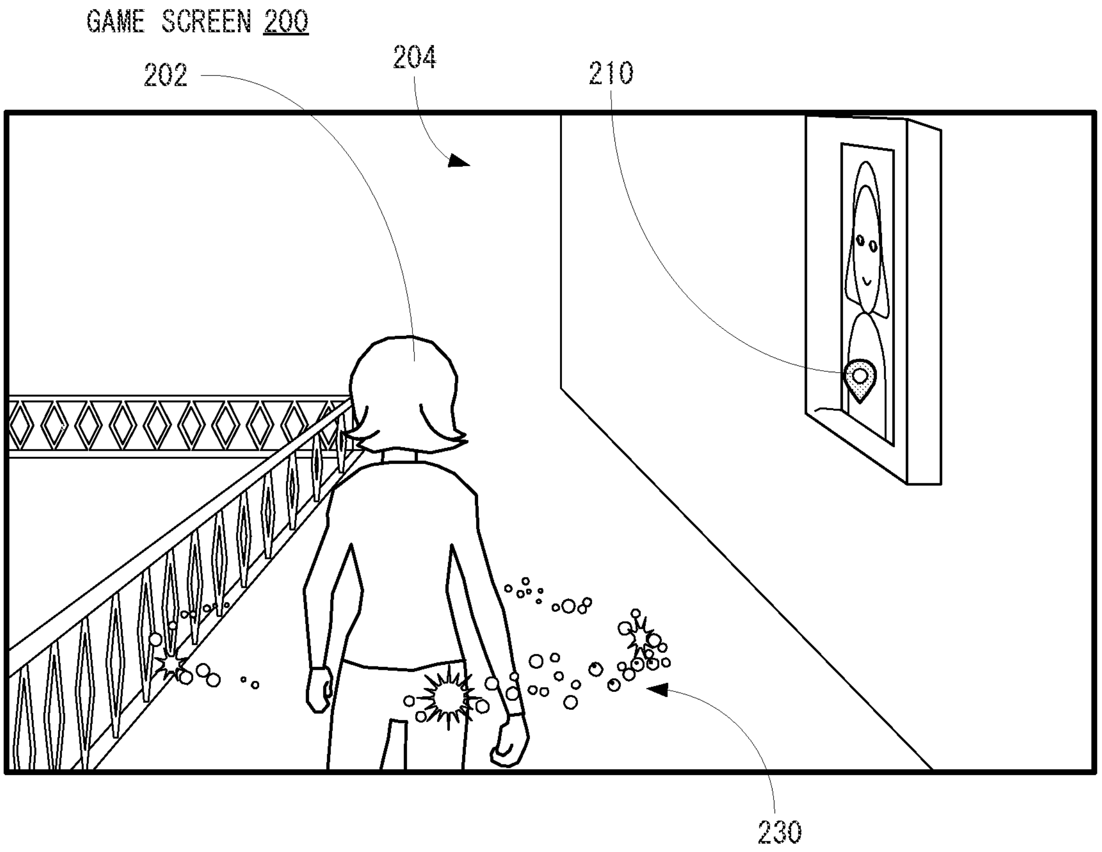
FIG. 16 is a view showing a still further non-limiting example game screen.

As understood by referring to also FIG. 16, if the player character 202 climbs the stairs and moves a path to the left, the player character 202 will approach the mark object 210. If a distance from the player character 202 to the mark object 210 becomes equal to or less than a predetermined distance (e.g., six (6) meters in the virtual space), the indicating object 220 is erased and a plurality of particle objects 230 are displayed in a position that the indicating object 220 was displayed. That is, the plurality of particle objects 230 are displayed instead of the indicating object 220. Then, the plurality of particle objects 230 move toward the mark object 210.

However, when the indicating object 220 is erased and the plurality of particle objects 230 are displayed, if the player character 202 moves away from the mark object 210 and thus the distance from the player character 202 to the mark object 210 becomes larger than the predetermined distance, the plurality of particle objects 230 are erased, and the indicating object 220 is displayed.

In addition, in the first embodiment, when the distance from the player character 202 to the mark object 210 becomes equal to or less than the predetermined distance, the indicating object 220 is erased; however, it is not necessary to erase the indicating object 220.

Figure 17:
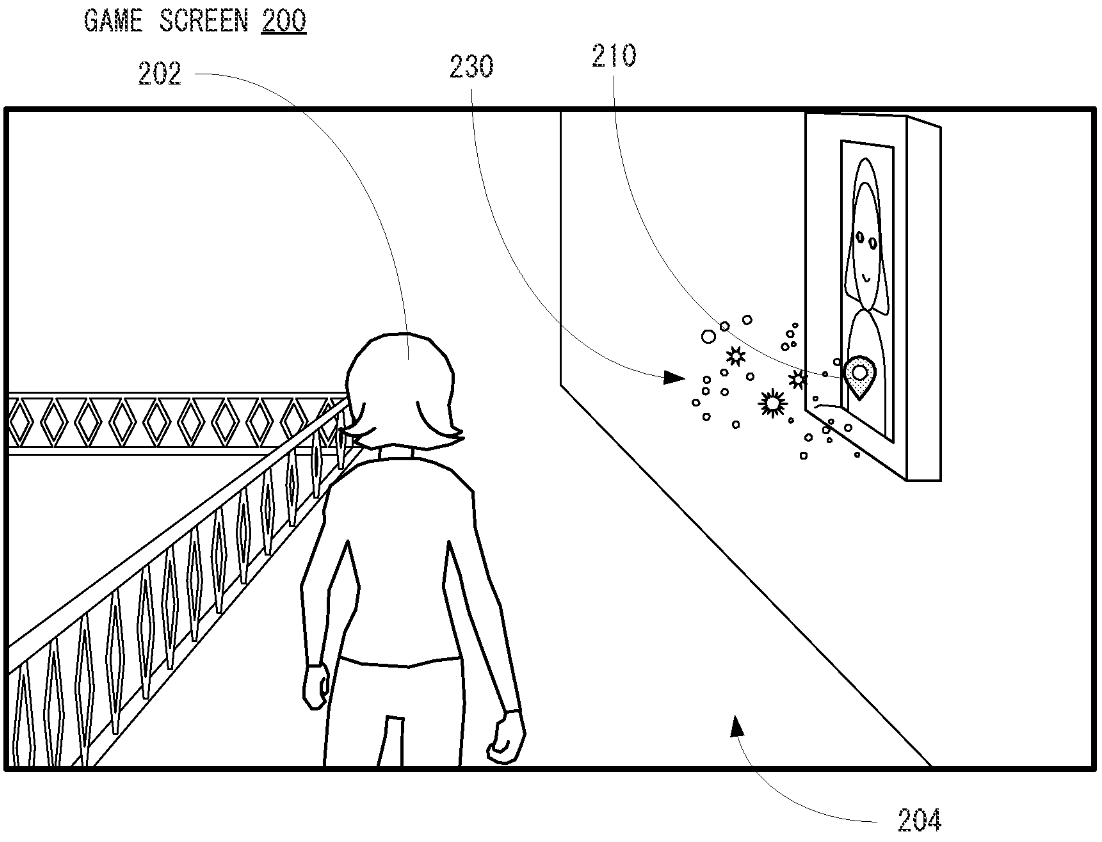
FIG. 17 is a view showing a still more further non-limiting example game screen.

FIG. 16 is a view showing a non-limiting example game screen 200 when the distance from the player character 202 to the mark object 210 becomes equal to or less than the predetermined distance. FIG. 17 is a view showing a non-limiting example game screen 200 in a state where the plurality of particle objects 230 slightly move toward the mark object 210 from a state shown in FIG. 16.

As shown in FIG. 16, if the distance from the player character 202 to the mark object 210 becomes equal to or less than the predetermined distance, the indicating object 220 is erased, and the plurality of particle objects 230 appear in this position where the indicating object 220 was displayed. Thereafter, as shown in FIG. 17, the plurality of particle objects 230 fly toward the mark object 210, respectively. Since the plurality of particle objects 230 are thus moved toward the mark object 210, it is possible for the player to know the position of the mark object 210 directly. That is, it is possible to turn an attention of the player to the mark object 210. As described in the above, the particle objects 230 are displayed instead of the indicating object 220, and therefore, it is expectable that an attention of the player is directed to the mark object 210 than a case of not erasing the indicating object 220.

An operation by the player causes the player character 202 to inspect the background object 204 that the mark object 210 is arranged, or perform a predetermined operation with respect to the background object 204. This makes the predetermined event set to the background object 204 be executed, and the virtual game can be advanced. That is, the virtual game cannot be advanced by only reaching or passing through the mark object 210, the virtual game can be advanced when the predetermined event set to the corresponding background object 204 is executed. When the predetermined event is ended, the indicating object 220 is arranged so as to indicate a next target point. Then, the virtual game is completed when the final goal is achieved.

Figure 18:
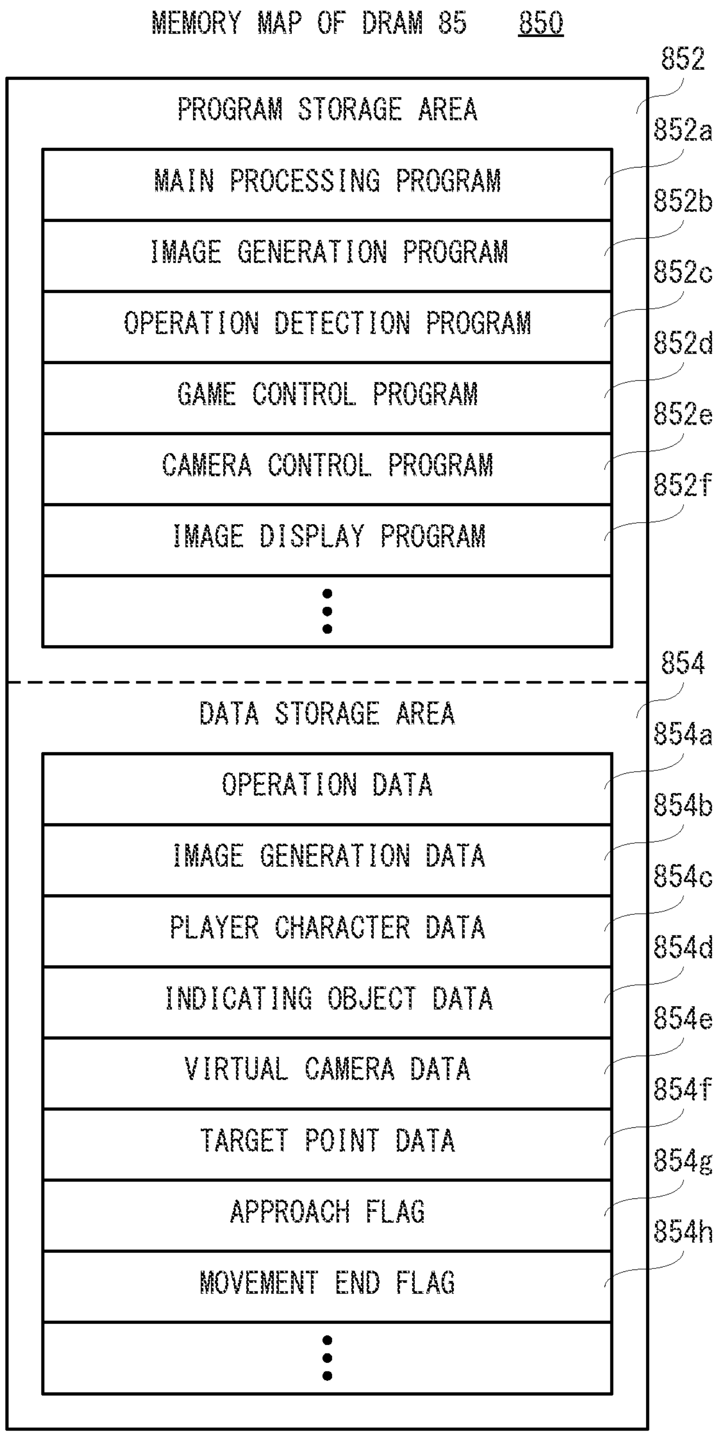
FIG. 18 is a view showing a non-limiting example memory map of a DRAM of the main body apparatus shown in FIG. 6.

FIG. 18 is a view showing a non-limiting example memory map 850 of the DRAM 85 shown in FIG. 6. As shown in FIG. 18, the DRAM 85 includes a program storage area 852 and a data storage area 854. The program storage area 852 is stored with a program of game application (i.e., game program). As shown in FIG. 18, the game program includes a main processing program 852*a*, an image generation program 852*b*, an operation detection program 852*c*, a game control program 852*d*, a camera control program 852*e*, an image display program 852*f*, etc. However, a function of displaying images such as a game image is a function that the main body apparatus 2 is provided with. Therefore, the image display program 852*f* is not included in the game program.

Although a detailed description is omitted, at a proper timing after a power of the main body apparatus 2 is turned on, a part or all of each of the programs 852*a*-852*f* is read from the flash memory 84 and/or a storage medium attached to the slot 23 to be stored in the DRAM 85. However, a part or all of each of the programs 852*a*-852*f* may be acquired from other computers capable of performing communication with the main body apparatus 2.

The main processing program 852*a* is a program for executing overall game processing (hereinafter, referred to as "overall processing") of a virtual game of the first embodiment.

The image generation program 852*b* is a program for generating, using image generation data 854*b* described later, display image data corresponding to various kinds of images such as a game image. This image generation program 852*b* includes processing that arranges the above-described indicating object 220 (see FIG. 23).

The operation detection program 852*c* is a program for acquiring the operation data 854*a* from the left controller 3 and/or the right controller 4.

The game control program 852*d* is a program for executing game control processing of the virtual game. The game control processing includes processing that makes the player character 202 perform an arbitrary action or operation according to an operation of the player, processing that makes the non-player character perform an arbitrary action or operation without regarding to an operation of the player. However, in the game control processing, there is a case of changing the position and the orientation of the player character 202 according to an advance of the virtual game regardless of an operation of the player.

The camera control program 852*e* is a program for changing the position and the orientation of the virtual camera 250 according to an operation of the player or according to the advance of the virtual game without regarding to an operation of the player.

The image display program 852*f* is a program for outputting to a display the display image data generated according to the image generation program 852*b*. Therefore, images corresponding to the display image data (game screen 200, etc.) are displayed on the display such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with the operation data 854*a*, the image generation data 854*b*, player character data 854*c*, indicating object data 854*d*, virtual camera data 854*e*, target point data 854*f*, etc. Moreover, the approach flag 854*g* and a movement end flag 854*i* are provided in the data storage area 854.

The operation data 854*a* is operation data received from the left controller 3 and/or the right controller 4. In the first embodiment, when the main body apparatus 2 receives the operation data from both of the left controller 3 and the right controller 4, the main body apparatus 2 stores the operation data 854*a* while making the left controller 3 and the right controller 4 be identifiable. Moreover, when one or more further controllers are used, the main body apparatus 2 stores the operation data 854*a* while making the one or more further controllers identifiable.

The image generation data 854*d* is data required for generating the display image data, such as polygon data and texture data.

The player character data 854*c* includes current position data, orientation data and item data of the player character 202. The current position data of the player character 202 includes data of a current position of the player character 202 in virtual space, i.e., data of the three-dimensional coordinates. The orientation data of the player character 202 includes data of a current orientation of the player character 202 in the virtual space. The item data of the player character 202 includes a kind of item and data of the number of items that the player character 202 possesses.

The indicating object data 854*d* includes current position data and orientation data of the indicating object 220. The current position data of the indicating object 220 includes data of a current position of the indicating object 220 in the virtual space, i.e., the data of three-dimensional coordinates. As described above, the current position of the indicating object 220 includes a predetermined position set for the player character 202, which is a position that the current position of the player character 202 is shifted upward by a predetermined length (e.g., one-hundred and ten (110) centimeters). The orientation data of the indicating object 220 is data of a current orientation of the indicating object 220 in the virtual space.

The virtual camera data 854*e* includes the current position data and the orientation data of the virtual camera 250. The current position data of the virtual camera 250 includes data of a current position of the virtual camera 250 in the virtual space, i.e., data of three-dimensional coordinates. The orientation data of the virtual camera 250 includes data of a current direction of the virtual camera 250 in the virtual space.

The target point data 854*f* includes position data and passage flag for each of a plurality of target points set in the virtual space. The plurality of target points are set in an order according to the advance of the virtual game. As described above, the target point includes the positions of the mark objects 210 and one or more waypoints for reaching respective the mark object 210. The passage flag is a flag for determining whether the player character 202 passes through the target point. As to the position of the mark object 210, the passage flag is turned off until the predetermined event that is set to the background object 204 corresponding to the mark object 210 is completed, and after the predetermined event is completed, the passage flag is turned on. Moreover, as to the waypoint, the passage flag is turned off before the player character 202 passes through the waypoint in the forward direction, and when the player character 202 passes through the waypoint in the forward direction, the passage flag is turned on. Moreover, the passage flag is turned off in also a case where the player character 202 passes through the waypoint up to the mark object 210 in the reverse direction before the predetermined event set to the background object 204 corresponding to the mark object 210 is completed.

The approach flag 854*g* is a flag for determining whether the player character 202 approaches the position of the mark object 210 set to the target point. When the distance from the current position of the player character 202 to the position of the mark object 210 that is the current target point is less than the predetermined distance (in the first embodiment, six (6) meters in the virtual space), it is determined that the player character 202 approached the position of the mark object 210 that is the current target point, and thus, the approach flag 854*g* is turned on. On the other hand, when the distance from the current position of the player character 202 to the position of the mark object 210 that is the current target point is equal to or longer than the predetermined distance, it is determined that the player character 202 does not approach the position of the mark object 210 that is the current target point, and thus, the approach flag 854*g* is turned off.

The movement end flag 854*h* is a flag for determining whether movement of the plurality of particle objects 230 is ended. When all the plurality of particle objects 230 reach to the position of the mark object 210 that is the current target point, it is determined that the movement of the plurality of particle objects 230 is ended, and thus, the movement end flag 854*h* is turned on. On the other hand, when there is a particle object 230 not having reached to the position of the mark object 210 that is the current target point (i.e., during movement), it is determined that the movement of the plurality of particle objects 230 is not ended, and thus, the movement end flag 854*h* is turned off.

Although illustration is omitted, the data storage area 854 is stored with other data such as data of the non-player object(s) and the background object(s) that are arranged in the virtual space, and is provided with flag(s) and timer(s) (or counter(s)).

Figure 19:
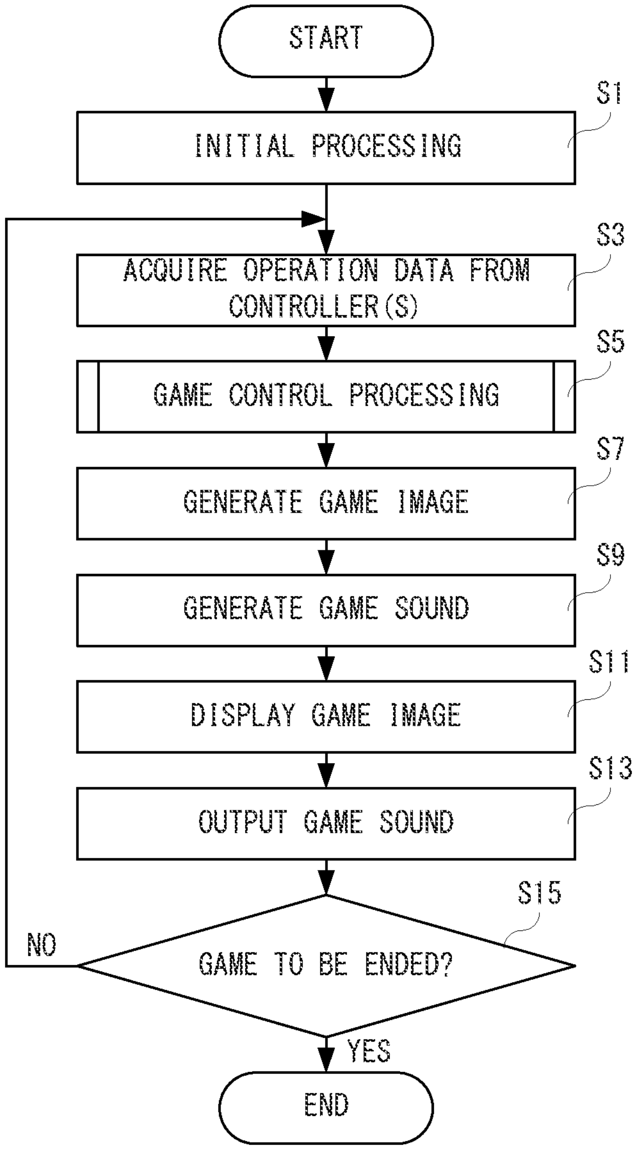
FIG. 19 is a flowchart showing non-limiting example overall processing of a processor(s) of the main body apparatus shown in FIG. 6.
Figure 20:
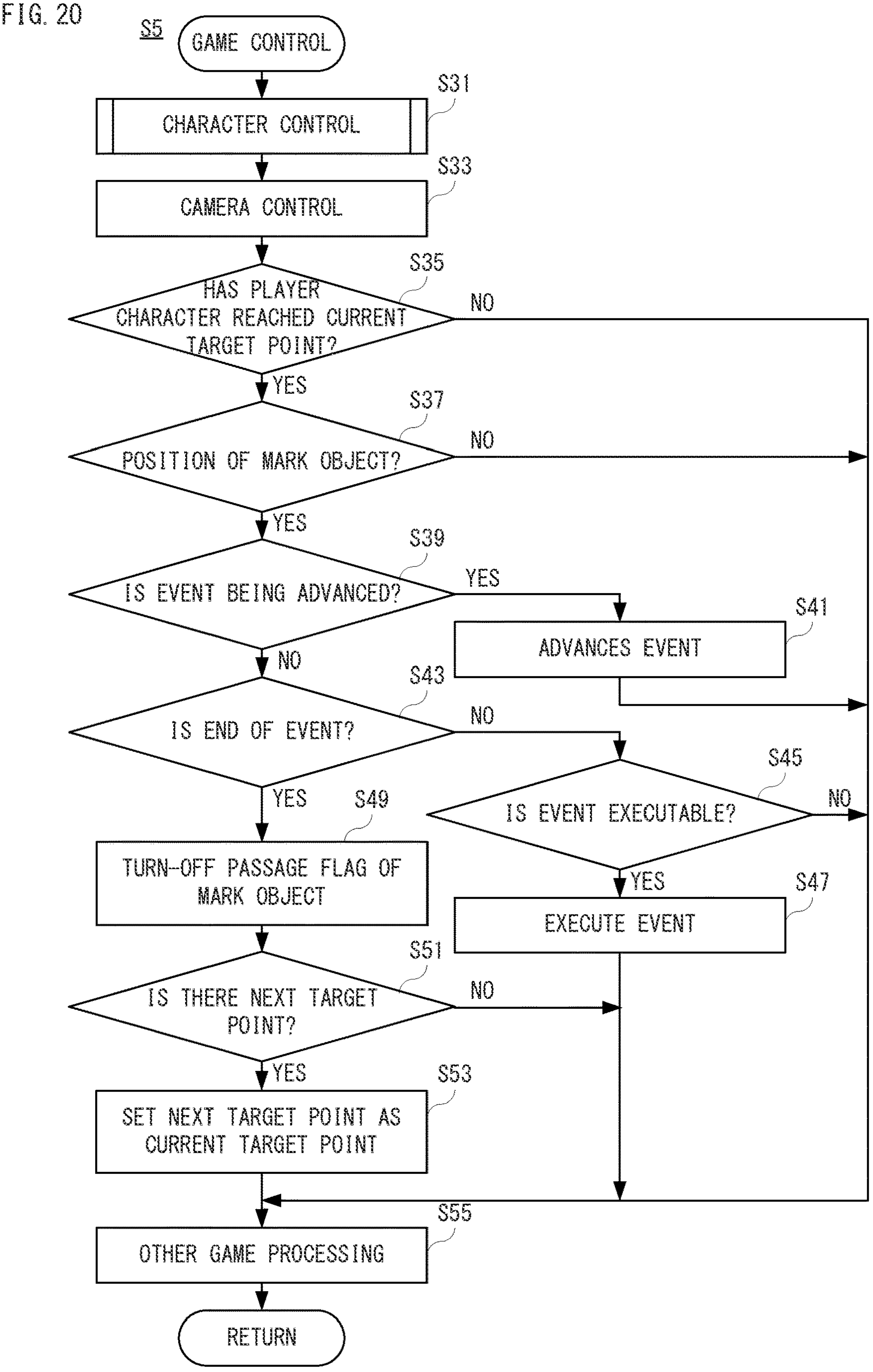
FIG. 20 is a flowchart showing non-limiting example game control processing of the processor(s) of the main body apparatus shown in FIG. 6.
Figure 21:
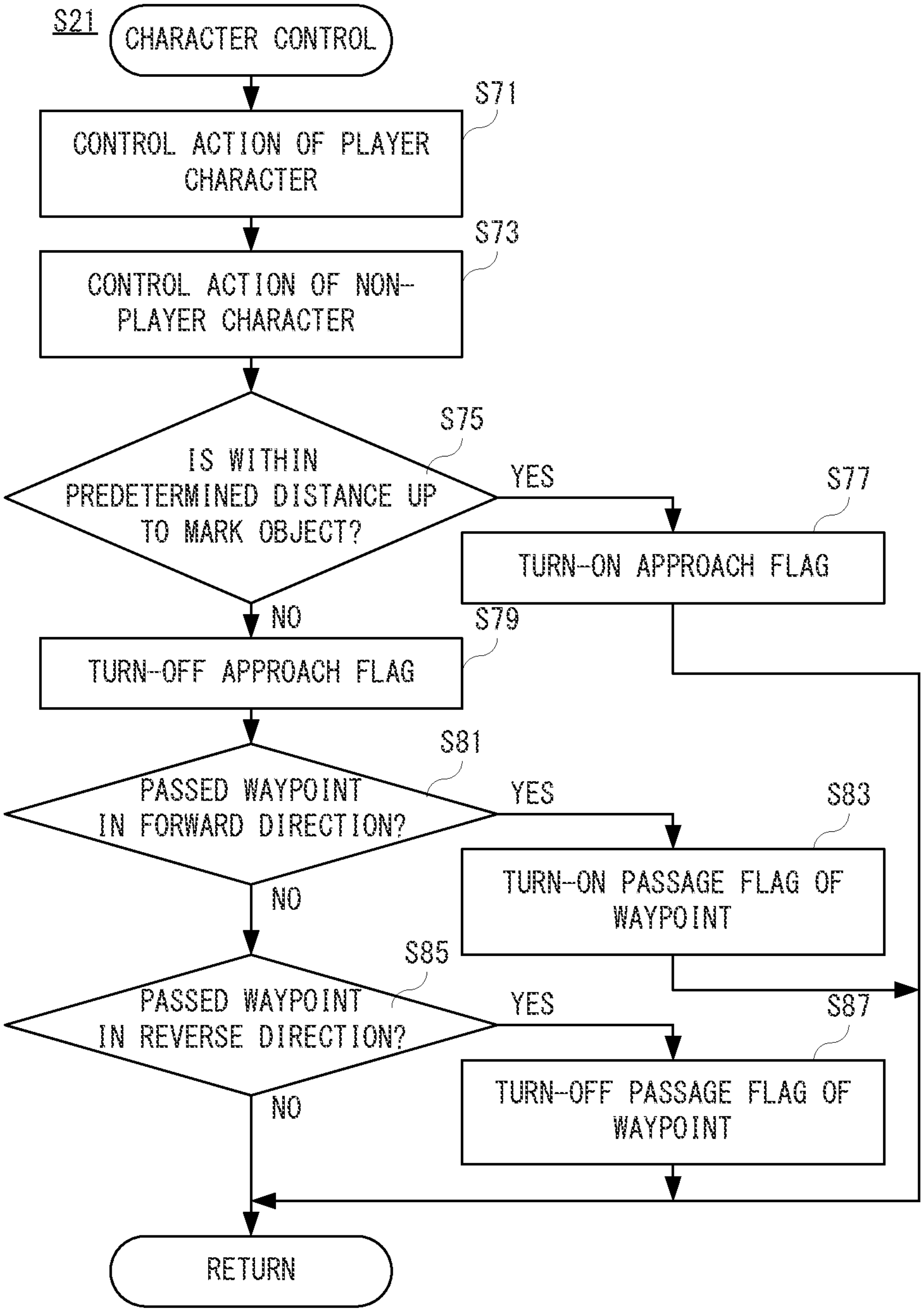
FIG. 21 is a flowchart showing non-limiting example character control processing of the processor(s) of the main body apparatus shown in FIG. 6.
Figure 22:
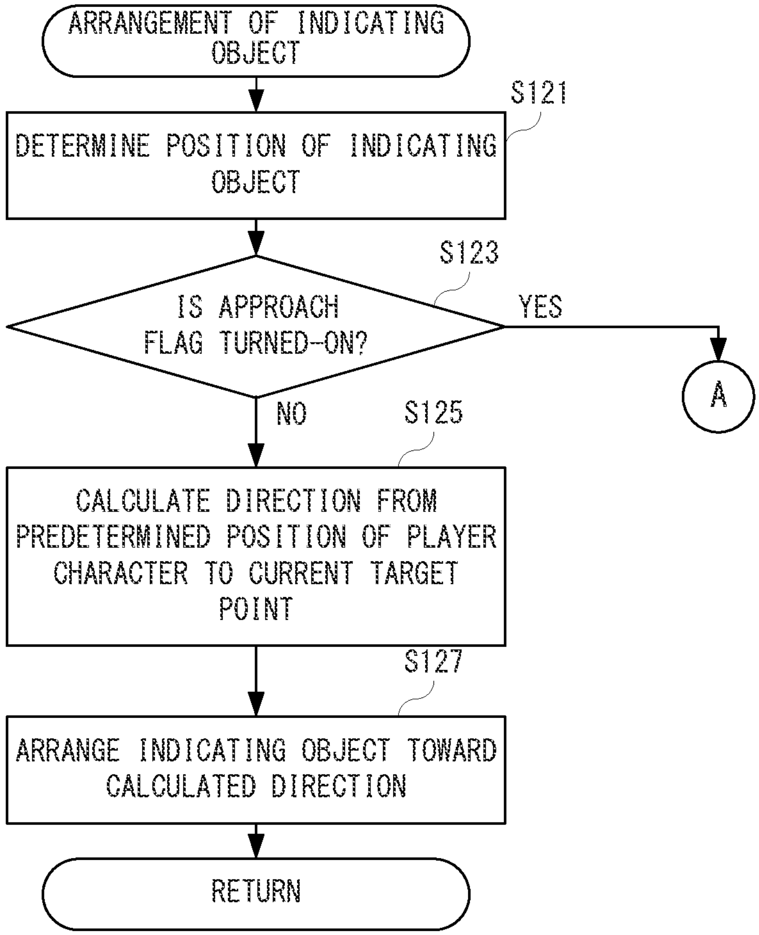
FIG. 22 is a flowchart showing a part of non-limiting example indicating object arrangement processing of the processor(s) of the main body apparatus shown in FIG. 6.
Figure 23:
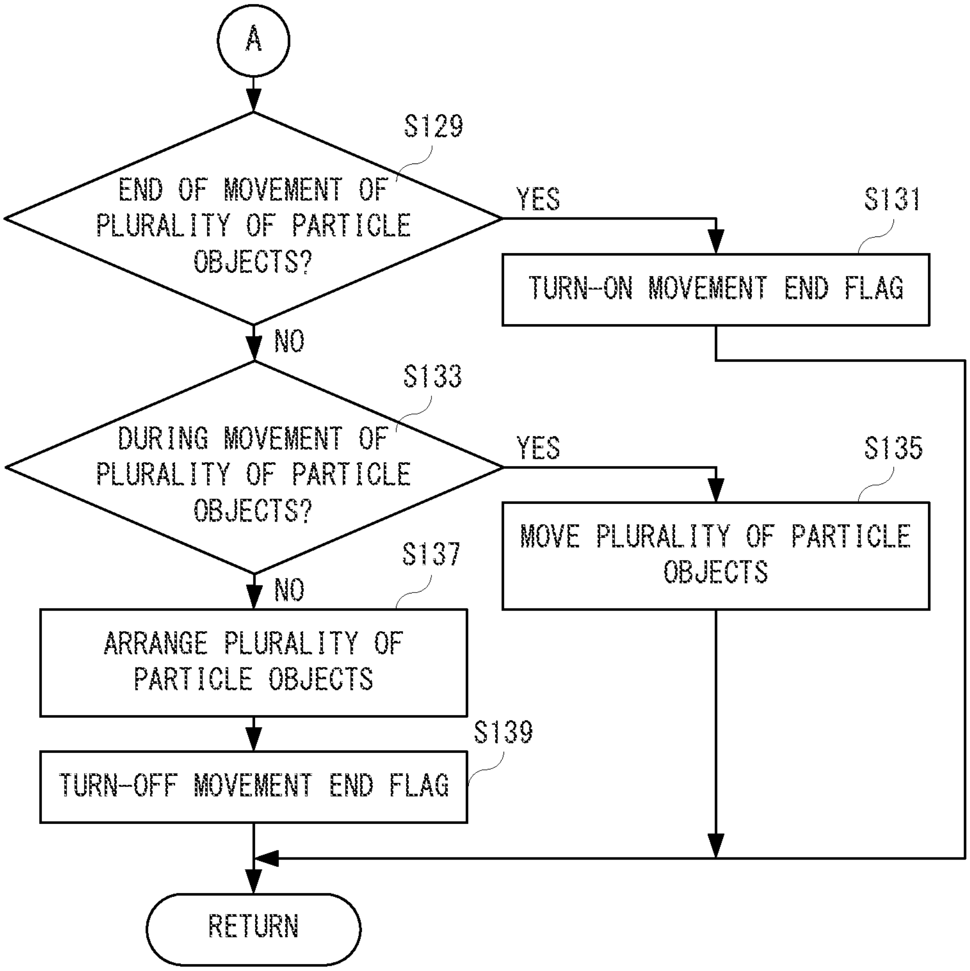
FIG. 23 is a flowchart showing another part of the non-limiting example indicating object arrangement processing of the processor(s) of the main body apparatus shown in FIG. 6, following FIG. 22.

FIG. 19 is a flowchart showing non-limiting example processing (overall processing) of the game program by the processor 81 (or computer) of the main body apparatus 2. FIG. 20 is a flowchart showing non-limiting example game control processing by the processor 81 of the main body apparatus 2. FIG. 21 is a flowchart showing non-limiting example character control processing by the processor 81 of the main body apparatus 2. FIG. 22 and FIG. 23 are flowcharts showing non-limiting example indicating object arrangement processing by the processor 81 of the main body apparatus 2. In the following, the overall processing, the game control processing, the character control processing and the indicating object arrangement processing will be described using FIG. 19-FIG. 23.

However, processing of respective steps of the flowcharts shown in FIG. 19-FIG. 23 are mere examples, and if the same or similar result is obtainable, an order of the respective steps may be exchanged. Moreover, in the first embodiment, it will be described that the processing of the respective steps of the flowcharts shown in FIG. 19-FIG. 23 are basically executed by the processor 81; however, some steps may be executed by a processor(s) and/or a dedicated circuit(s) other than the processor 81.

When the power of the main body apparatus 2 is turned on, prior to execution of the overall processing, the processor 81 executes a boot program stored in a boot ROM not shown, whereby respective units including the DRAM 85, etc. are initialized. When the execution of the game program of the first embodiment is instructed by the player, the main body apparatus 2 will start the overall processing.

As shown in FIG. 19, if the overall processing is started, the processor 81 executes initial setting in a step S1. Here, the processor 81 arranges the player character 202, the non-player character and the background object 204 to respective initial positions in the virtual space. Moreover, the processor 81 arranges the indicating object 220 based on the initial position of the player character 202. However, in starting the game from where the player left off, the player character 202, the non-player character and the background object 204 are arranged in positions at the time of being saved. At this time, the data of the initial position or the position at the time of being saved of the player character 202 is stored as the data of the current position of the player character data 854*c* in the data storage area 854. Moreover, in this step S1, the processor 81 sets the target point to be reached or passed through next as the current target point by referring to the target point data 854*f*.

In a subsequent step S3, the operation data transmitted from the left controller 3 and/or the right controller 4 is acquired, and in a step S5, the game control processing described later is executed (see FIG. 20).

In a next step S7, the game image is generated. Here, the processor 81 generates the game image data corresponding to the game images (game screen 200, etc.) based on a result of the game control processing in the step S5. For example, when generating the game image, the processor 81 arranges the player character 202 to the current position in the virtual space, and arranges the non-player character. Moreover, the processor 81 arranges the indicating object 220 based on the current position of the player character 202 (see FIG. 22 and FIG. 23). Furthermore, the processor 81 arranges (generates) the background object according to the current position of the player character 202. Therefore, a certain scene (sight) is generated. An image viewing this scene from the virtual camera 250 (imaged image) is generated as the game image.

Moreover, the game sound is generated in a step S9. Here, the processor 81 generates the sound data corresponding to the game sound according to the result of the game control processing of the step S5.

Subsequently, the game image is displayed in a step S11. Here, the processor 81 outputs the game image data generated in the step S7 to the display 12. Moreover, the game sound is output in a step S13. Here, the processor 81 outputs the game sound data generated in the step S9 to the speaker 88 through the codec circuit 87.

Then, in a step S15, it is determined whether the game is to be ended. The determination in the step S15 is performed based on whether the player issues an instruction to end the game.

If "NO" is determined in the step S15, that is, if the game is not to be ended, the process returns to the step S3. On the other hand, if "YES" is determined in the step S15, that is, if the game is to be ended, the overall game processing is terminated.

As shown in FIG. 20, if the game control processing shown in the step S5 is started, the processor 81 executes the character control processing (see FIG. 21) described later in a step S31. In a next step S33, the camera control processing is executed according to an operation of the player or the advance of the game.

In a subsequent step S35, it is determined whether the player character 202 arrived at the current target point. If "NO" is determined in the step S35, that is, if the player character 202 has not arrived at the current target point, the process proceeds to a step S55. On the other hand, if "YES" is determined in the step S35, that is, if the player character 202 arrived at the current target point, it is determined, in a step S37, whether the current target point is a position of the mark object 210.

If "NO" is determined step S37, that is, if the current target point is a waypoint, the process proceeds to the step S55. On the other hand, if "YES" is determined step S37, that is, if the current target point is a position of the mark object 210, it is determined, in a step S39, whether the event is being advanced.

If "YES" is determined in the step S39, that is, if the event is being advanced, the event is advanced in a step S41, and the process proceeds to the step S55. On the other hand, if "NO" is determined in the step S39, that is, if the event is not being advanced, it is determined, in a step S43, the event is ended.

If "NO" is determined in the step S43, that is, if the event is not ended, it is determined, in a step S45, whether the event is executable. That is, it is determined whether the trick, puzzle or riddle to execute the event is solved by the player (player character 202).

If "NO" is determined in the step S45, that is, if the event is not executable, the process proceeds to the step S55. On the other hand, if "YES" is determined in the step S45, that is, if the event is executable, the event is executed in a step S47, and then, the process proceeds to the step S55.

Moreover, if "YES" is determined in the step S43, that is, if the event is ended, the passage flag of the position of the mark object 210 is turned on in a step S49. Here, the processor 81 turns on the passage flag for the current target point with reference to the target point data 854*f*.

In a next step S51, it is determined whether there is any next target point. Here, the processor 81 determines, with reference to the target point data 854*f*, whether there is the target point to be reached or to be passed through next after the current target point.

If "NO" is determined in the step S51, that is, there is not a next target point, the process proceeds to the step S55. On the other hand, if "YES" is determined in the step S51, that is, if there is a next target point, the next target point is set as the current target point in the step S53, and the process proceeds to the step S55.

In the step S55, other game processing is executed and the game control processing is terminated. In this step S55, processing other than an action or operation of the player character 202 and the non-player character, such as processing of game clear, saving processing of the game data, etc. are executed.

As shown in FIG. 21, if the character control processing is started, the processor 81 controls an action or operation of the player character 202 in a step S71. When changing the position and/or the orientation of the player character 202 in the step S71, position data and/or orientation data are updated in the player character data 854*c*. However, when the player does not perform an operation related to an action or operation of the player character 202, the processing of the step S71 may be skipped. Moreover, there is an occasion that the position and the orientation of the player character 202 are forcibly updated by the processor 81 without relation to an operation of the player. Furthermore, in the step S71, the player character 202 is made to inspect the background object 204, perform an action or operation to the background object 204, acquire an item, solve a riddle, solve a puzzle, or talk with the non-player character.

In a subsequent step S73, an action or operation of the non-player character is controlled. However, when not controlling an action or operation of the non-player character, the processor 81 may skip the processing of step S73.

Subsequently, it is determined, in a step S75, whether the distance from the current position of the player character 202 to the position of the mark object 210 that is the current target point is within the predetermined distance (six (6) meters in the virtual space). If "YES" is determined in the step S75, that is, if the distance from the position of the player character 202 to the position of the mark object 210 is within the predetermined distance, the approach flag 854*g* is turned on in a step S77, and terminating the character control processing and returning to the game control processing.

On the other hand, if "NO" is determined in the step S75, that is, if the distance from the position of the player character 202 to the position of the mark object 210 is not within predetermined distance, the approach flag 854*g* is turned off in a step S79, and it is determined, in a step S81, whether the player character 202 passed through the waypoint in the forward direction.

If "YES" is determined in the step S81, that is, if the player character 202 passed through the waypoint in the forward direction, the passage flag for the target point that is the waypoint is turned on in a step S83, and terminating the character control processing and returning to the game control processing.

On the other hand, if "NO" is determined in the step S81, that is, if the player character 202 did not pass through the waypoint in the forward direction, it is determined, in a step S85, whether the player character 202 passed through the waypoint in the reverse direction.

If "YES" is determined in the step S85, that is, if the player character 202 passed through the waypoint in the reverse direction, the passage flag for the target point that is the waypoint is turned off in a step S87, and terminating the character control processing and returning to the game control processing.

On the other hand, if "NO" is determined in the step S85, that is, if the player character 202 did not pass through the waypoint in the reverse direction, terminating the character control processing and returning to the game control processing.

FIG. 22 and FIG. 23 are flowcharts showing non-limiting example indicating object arrangement processing to be executed in generation processing of the game image in the step S7 shown in FIG. 19.

As shown in FIG. 22, when starting the indicating object arrangement processing, the position of the indicating object 220 is determined in a step S121. Here, the processor 81 determines a position that the position of the player character 202 is shifted upward by the predetermined distance (e.g., one-hundred and ten (110) centimeters) as the position of the indicating object 220, and stores (or updates) the current position data included in the indicating object data 854*d*.

In a next step S123, it is determined whether the approach flag 854*g* is turned on. If "YES" is determined in the step S123, that is, if the approach flag 854*g* is turned on, the process proceeds to a step S129 shown in FIG. 23.

On the other hand, if "NO" is determined in the step S123, that is, if the approach flag 854*g* is turned off, in a step S125, a direction toward the current target point from the predetermined position of the player character 202 is calculated, and the orientation data included in the indicating object data 854*d* is stored (or updated).

In a next step S127, the indicating object 220 is arranged in the position determined in the step S121 toward the direction calculated in the step S125, and terminating the indicating object arrangement processing and returning to the game image generation processing of the step S7.

As described above, if "YES" is determined in the step S123, it is determined whether movement of the plurality of particle objects 230 is ended in the step S129 shown in FIG. 23. If "YES" is determined in the step S129, that is, if the movement of the plurality of particle objects 230 is ended, in a step S131, the movement end flag 854*h* is turned on, and terminating the indicating object arrangement processing and returning to the game image generation processing in the step S7.

On the other hand, if "NO" is determined in the step S129, that is, if the movement of the plurality of particle objects 230 is not ended, it is determined, in a step S133, whether the plurality of particle objects 230 are on movement.

If "YES" is determined in the step S133, that is, if the plurality of particle objects 230 are on movement, in a step S135, the plurality of particle objects 230 are made to move toward the position of the mark object 210 by one (1) frame, and terminating the indicating object arrangement processing and returning to the game image generation processing in the step S7.

On the other hand, if "NO" is determined in the step S133, that is, if the plurality of particle objects 230 are not on movement, in a step S137, the plurality of particle objects 230 are arranged around the player character 202 that the indicating object 220 has been displayed, and in a step S139, the movement end flag 854*h* is turned off, and terminating the indicating object arrangement processing and returning to the game image generation processing in the step S7.

In addition, as to the indicating object 220 in the game image generation processing, the second direction indicating portion 220*b*, and the colored portions 222*a*, 222*b* and 222*c* in the first direction indicating portion 220*a* except the non-colored portions 224*a*, 224*b* and 224*c* are colored.

According to the first embodiment, since the orientation of the indicating object within a predetermined range of the player character to surround the player character can indicate not only the horizontal direction of the target point viewed from the player character but also the height direction of the target point viewed from the player character, it is possible to confirm always the direction that the player character should be moved as well as to confirm the positional relationship between the player character and the target point in the height direction.

In addition, in the first embodiment, when the distance from the position of the player character to the position of the mark object becomes less than the predetermined distance, the plurality of particle objects are made to move toward the mark object; however, it need not limited to this.

When a moving direction of the player character or a direction of a sight line of the player character is turned to the mark object, the plurality of particle objects may be made to move toward the mark object. Moreover, when satisfying these conditions complexly, the plurality of particle objects may be moved to the mark object.

Moreover, when the position and the orientation of the virtual camera have a predetermined positional relationship with the target point, the plurality of particle objects may be moved to the mark object. For example, the predetermine positional relationship is a state where the distance from the position of the player character to the position of the mark object is less than the predetermined distance and the target object is displayed on the screen. In this case, the condition may be that the target object is displayed within a certain percentage in up, down left and right from the center of the screen.

Second Embodiment

A game system 1 of the second embodiment is the same or similar to the first embodiment except that a shape of the indicating object and an indicating method for the target point, and therefore, in the following, different portions will be mainly described while omitting a description for duplicate portions.

Figure 24:
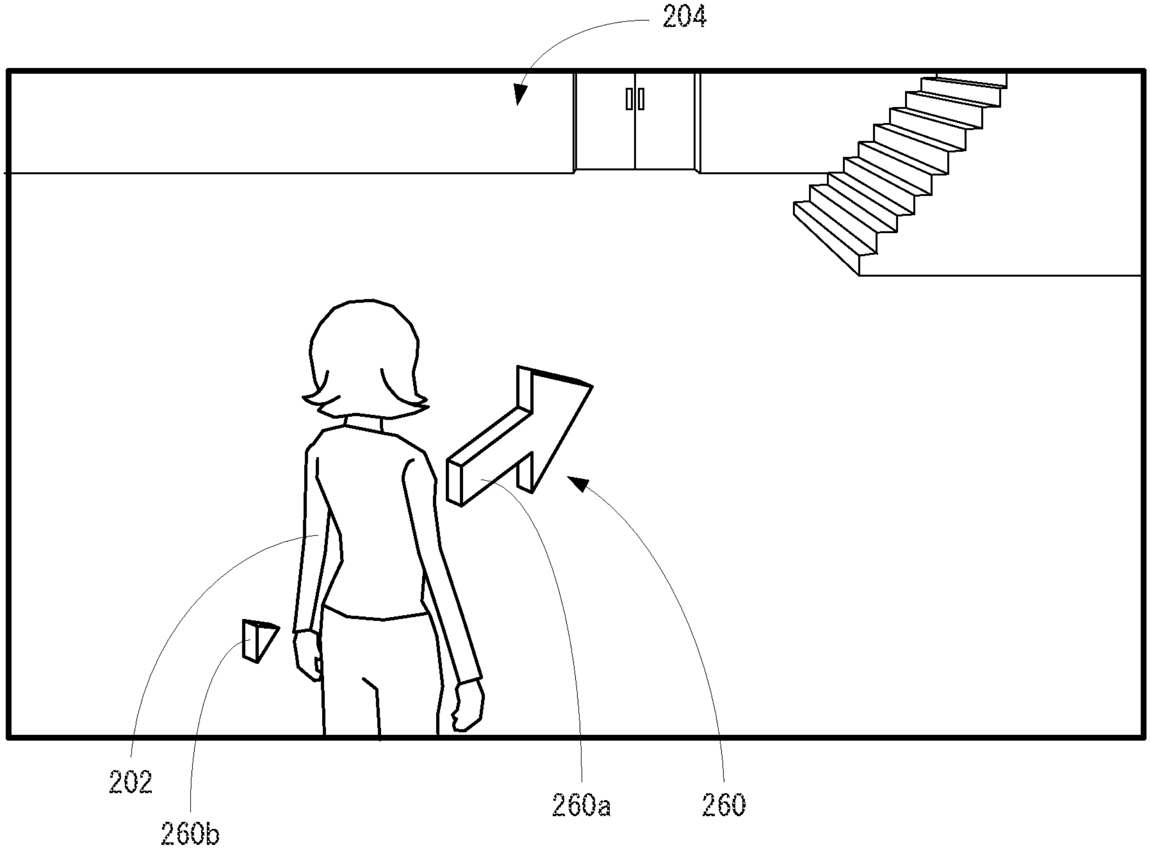
FIG. 24 is a view showing a non-limiting example game screen of a second embodiment.

FIG. 24 is a view showing a non-limiting example game screen 200 of the second embodiment. As shown in FIG. 24, in the game screen 200, the player character 202 and a plurality of background objects 204 are displayed as well as an indicating object 260 of the second embodiment is displayed.

As shown in FIG. 24, the indicating object 260 of the second embodiment includes a first direction indicating portion 260*a* (corresponding to "first portion") and a second direction indicating portion 260*b* (corresponding to "second portion"), and the first direction indicating portion 260*a* and the second direction indicating portion 260*b* are arranged on a straight line (see FIG. 25A) while sandwiching the player character. However, the first direction indicating portion 260*a* and the second direction indicating portion 260*b* are aligned with each other so that a direction indicated by an arrow of the first direction indicating portion 260*a* having an arrow shape and one vertex (i.e., tip end) of the second direction indicating portion 260*b* having a triangular shape correspond to each other.

In also the second embodiment, the indicating object 260 is arranged so that a reference position of the indicating object 260 overlaps with a predetermined position of the player character 202 (e.g., a center position of the torso at the height of the waist). As an example, the reference position of the indicating object 260 is set to a center position of the first direction indicating object portion 260*a* and the second direction indicating object portion 260*b* (see FIG. 25A, FIG. 25B, FIG. 27A and FIG. 27B).

A reason why the first direction indicating portion 260*a* and the second direction indicating portion 260*b* are thus provided so as to sandwich the player character 202 is for indicating at least a horizontal direction that indicates the target point even if the first direction indicating portion 260*a* or the second direction indicating portion 260*b* is hidden behind the player character 202 and cannot be seen.

Moreover, in the indicating object 260 of the second embodiment, the first direction indicating portion 260*a* is arranged on a side closer to the target point than the second direction indicating portion 260*b* across the player character 202. That is, the first direction indicating portion 260*a* is arranged in a position closer to the target point than the player character 202, and the second direction indicating portion 260*b* is arranged in a position further to the target point than the player character 202.

Figures 25A, 25B:
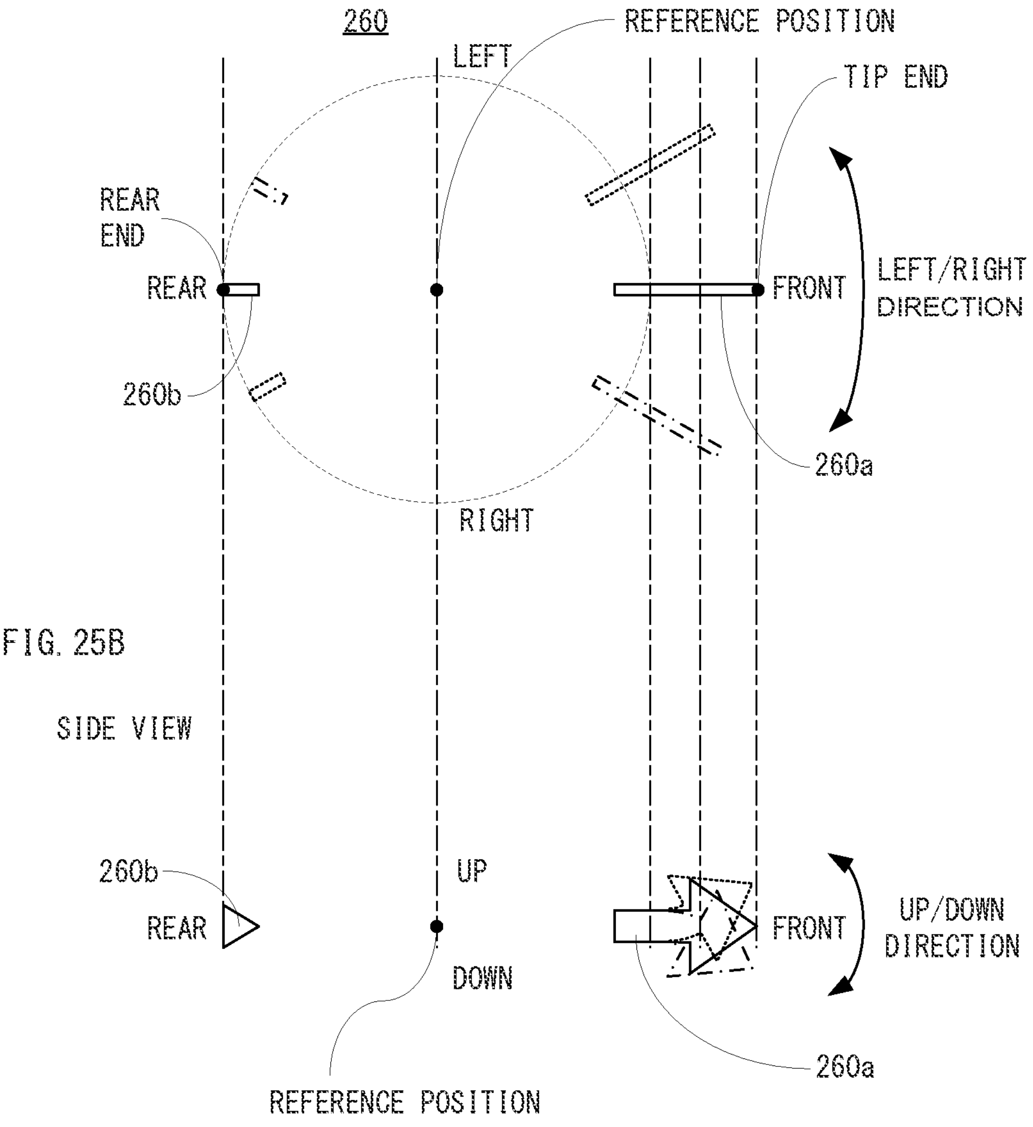
FIG. 25A is a view showing a non-limiting example indicating object of the second embodiment viewed from above.
FIG. 25B is a view showing the non-limiting example indicating object of the second embodiment viewed from side.

FIG. 25A is a top view showing a non-limiting example indicating object 260 that is arranged so that a plane becomes perpendicular to a horizontal plane of the virtual space as shown in FIG. 24, and FIG. 25B is a side view showing the non-limiting example indicating object 260 that is arranged so that the plane becomes perpendicular to the horizontal plane of the virtual space as shown in FIG. 24. In the second embodiment, when the depression angle or the elevation angle of the virtual camera 250 is less than a predetermined included angle (e.g., forty-five (45) degrees), the indicating object 260 is arranged so that the plane thereof becomes perpendicular to the horizontal plane. The indicating object 260 of the second embodiment will be described referring to FIG. 24, FIG. 25A and FIG. 25B.

The first direction indicating portion 260*a* is an object having an arrow-shaped plane with a thickness. Moreover, the first direction indicating portion 260*a* is colored entirely.

The second direction indicating portion 260*b* is an object having a triangular-shaped plane that is in the same plane as the first direction indicating portion 260*a* and separated from the first direction indicating portion 260*a* with a predetermined interval, with the same thickness as the first direction indicating portion 260*a*. Moreover, the second direction indicating portion 260*b* is colored entirely. As an example, the second direction indicating portion 260*b* is colored with the same color as the first direction indicating portion 260*a*. However, a shape of the second direction indicating portion 260*b* may be an arrow-shape.

In a state where the first direction indicating portion 260*a* is not deformed, a tip end of the indicating object 260 is an end of the first direction indicating portion 260*a* in a longitudinal direction of the indicating object 260. That is, it is a tip end of an arrow in the arrow-shaped. Moreover, in a state where the first direction indicating portion 260*a* is not deformed, a rear end of the indicating object 260 is an end opposite to the tip end in the longitudinal direction of the indicating object 260. That is, it is a position that the perpendicular line drawn from the vertex on a side of the first direction indicating portion 260*a* of the second direction indicating portion 260*b* to an opposite side intersects with the opposite side.

The indicating object 260 is rotated (or turned) within a plane parallel to the horizontal plane centering on a reference position, and the second direction indicating portion 260*b* is deformed so that the tip end is turned to the target point when the predetermined position of the player character 202 and the height of the target point are different from each other.

Specifically, as shown in FIG. 25A, when viewing from right above, the indicating object 260, i.e., the first direction indicating portion 260*a* and the second direction indicating portion 260*b* is rotated or turned centering on a reference position. In an example shown in FIG. 25A, on the assumption that the indicating object 260 that is linear and faces right on the drawing is the reference, the indicating object 260 when rotated or turned by thirty (30) degrees leftward (i.e., counterclockwise) centering on the reference position is drawn by a dotted line, and the indicating object 260 when rotated or turned by thirty (30) degrees rightward (i.e., clockwise) centering on the reference position is drawn by a one-dotted line.

Moreover, as shown in FIG. 25B, in the indicating object 260, the first direction indicating portion 260*a* is deformed so that the target point is indicated by a direction that the tip end faces, when viewing from just side. In an example shown in FIG. 25B, since the plane of the indicating object 260 is vertical to the horizontal plane, the indicating object 260 is deformed so that the arrow of the first direction indicating portion 260*a* is curved in a width direction, i.e., the up/down direction in the virtual space. In the example shown in FIG. 25B, on the assumption that the indicating object 260 that is linear and faces right on the drawing is a reference, the first direction indicating portion 260*a* when an angle that a direction indicated by the tip end being curved upward with respect to the horizontal plane is thirty (30) degrees is drawn by a dotted line, and the first direction indicating object 260*a* when an angle that a direction indicated by the tip end being curved downward with respect to the horizontal plane is thirty (30) degrees is drawn by a one-dotted line. However, the second direction indicating portion 260*b* is not deformed.

Therefore, in the second embodiment, a horizontal component of the direction indicated by the tip end of the first direction indicating portion 260*a* and the direction indicated by the second direction indicating portion 260*b* are the horizontal direction indicated by the indicating object 260, respectively. Moreover, in the second embodiment, an angle formed by the direction indicated by the tip end of the first direction indicating portion 260*a* with respect to the horizontal plane is a depression angle or an elevation angle when viewing the target point from a predetermined position.

It is possible for the player to know the horizontal direction of the target point by the orientation of the horizontal component of the first direction indicating portion 260*a* of the indicating object 260 and/or the orientation of the second direction indicating portion 260*b*, and to know the height of the target point with respect to the predetermined position of the player character 202 by the lean of the tip end of the first direction indicating portion 260*a* of the indicating object 260.

That is, a direction toward the target point from the predetermined position is calculated, and the indicating object 260 is arranged in the virtual space so that the second direction indicating portion 260*b* faces the orientation of the horizontal component of the calculated direction and the horizontal component of the orientation of the tip end of the first direction indicator 260*a* that is deformed so that the tip end faces the calculated direction faces the orientation of the horizontal component of the calculated direction.

In addition, the first direction indicating portion 260*a* and the second direction indicating portion 260*b* may be made as rounded corners. Moreover, the first direction indicating portion 220*a* may be in a shape that a plurality of arrows are superimposed with a slight shift in a width direction of the indicating object 260. Similarly, the second direction indicating portion 260*b* may be in a shape that a plurality of triangles are superimposed with a slight shift in a width direction of the indicating object 260. In such cases, the tip end of the first direction indicating portion 260*a* and the tip end of the second direction indicating portion 260*b* are jagged.

Figure 26:
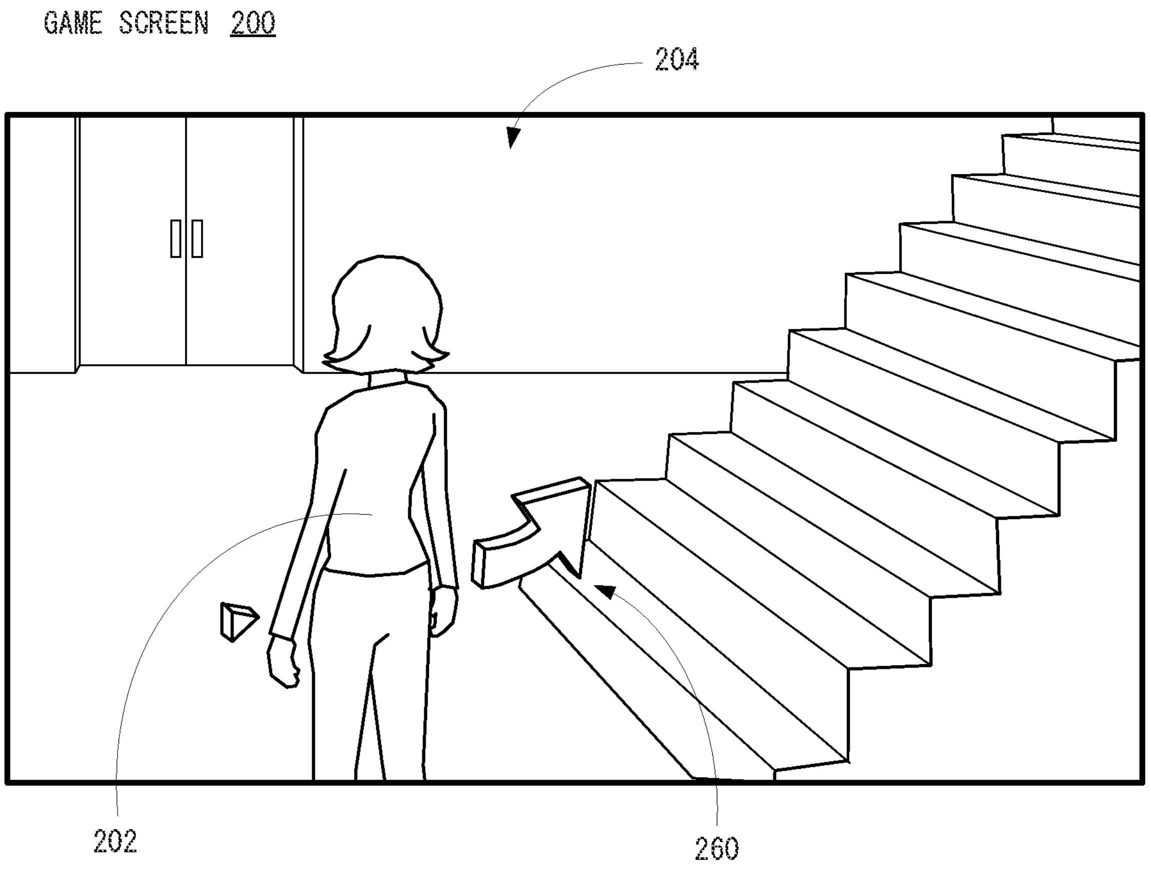
FIG. 26 is a view showing another non-limiting example game screen of the second embodiment.

FIG. 26 is a view showing a non-limiting example game screen 200 including the indicating object 260 when indicating the target point of a position higher than the predetermined position of the player character 202. In the game screen 200 shown in FIG. 26, the player character 202 moves up to an entrance of stairs, and the indicating object 260 indicates the target point that is set to a point that the stairs are climbed.

Moreover, in the second embodiment, if the depression angle or the elevation angle of the virtual camera 250 becomes equal to or larger than a predetermined angle (in the second embodiment, forty-five (45) degrees), the plane of the indicating object 260 is made parallel to a horizontal plane (i.e., horizontal). This is for making it easier to see the indicating object 260 displayed in the game screen 200. A reason is that if viewing the indicating object 260 from diagonally above or below when the plane of the indicating object 260 is vertical to the horizontal plane as shown in FIG. 25A, only thickness portions can be seen, and thus, a direction indicated by the first direction indicating portion 260*a* and the second direction indicating portion 260*b* becomes difficult to know. That is, in order to make the direction indicated by the indicating object 260 easier to know, the orientation of the plane of the indicating object 260 is changed.

Figure 27A:
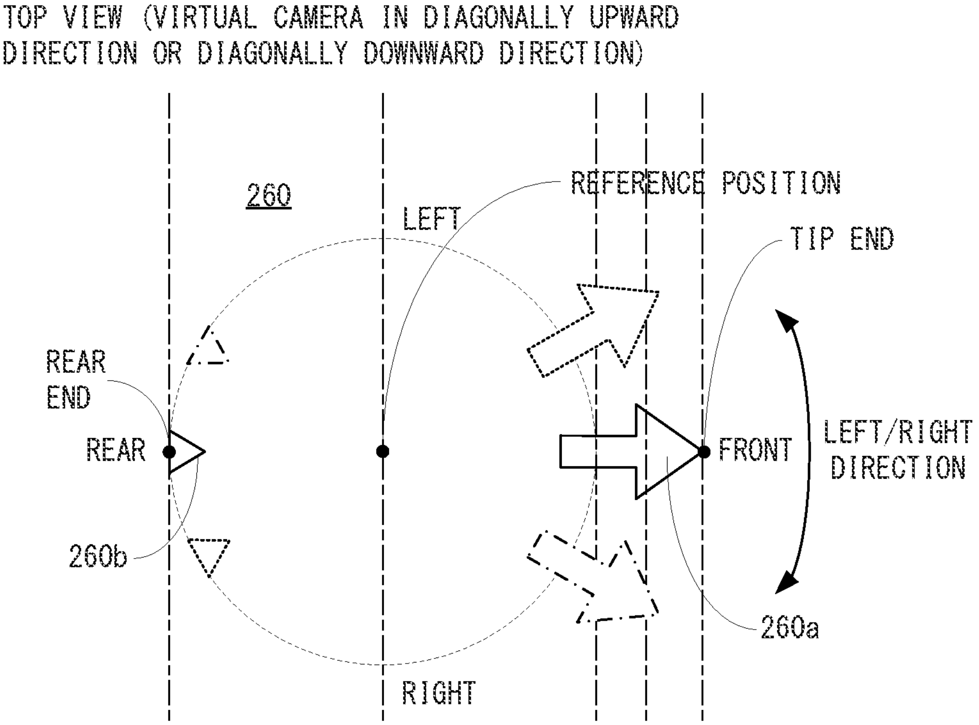
FIG. 27A is a top view showing a further non-limiting example indicating object of the second embodiment viewed from above.

FIG. 27A is a top view showing a non-limiting example indicating object 260 when arranged to be parallel the plane of the indicating object 260 to the horizontal plane in the virtual space in a state where the first direction indicating portion 260*a* is not deformed. Moreover, FIG. 27B is a side view showing the non-limiting example indicating object 260 when arranged to be parallel the plane of the indicating object 260 to the horizontal plane in the virtual space in a state where the first direction indicating portion 260*a* is not deformed.

As described above, when viewing from right above, the indicating object 260, i.e., the first direction indicating portion 260*a* and the second direction indicating portion 260*b* is rotated or turned centering on the reference position. In an example shown in FIG. 27A, on the assumption that the indicating object 260 that is linear and faces right on the drawing is a reference, the indicating object 260 when rotated or turned by thirty (30) degrees leftward (i.e., counterclockwise) centering on the reference position is drawn by a dotted line, and the indicating object 260 when rotated or turned by thirty (30) degrees rightward (i.e., clockwise) centering on the reference position is drawn by a one-dotted line.

Figure 27B:
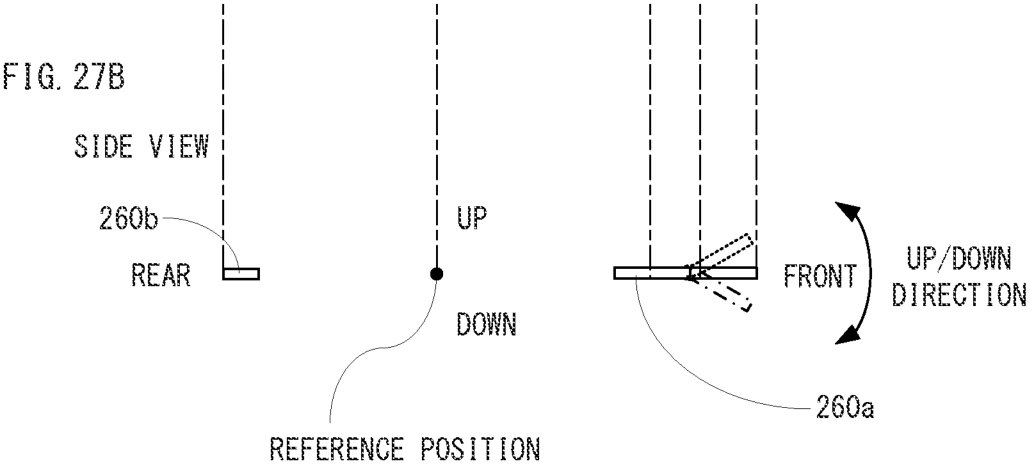
FIG. 27B is a side view showing the further non-limiting example indicating object of the second embodiment viewed from side.

Moreover, as shown in FIG. 27B, in the indicating object 260, the first direction indicating portion 260*a* is deformed so that the target point is indicated by a direction that the tip end faces when viewing from just side. In an example shown in FIG. 27B, since the plane of the indicating object 260 is parallel to the horizontal plane when the first direction indicating portion 260*a* is not deformed, the arrow of the first direction indicating portion 260*a* is curved in a width direction, i.e., the up/down direction in the virtual space. In the example shown in FIG. 27B, on the assumption that the indicating object 260 that is linear and faces right on the drawing is a reference position, the first direction indicating portion 260*a* when an angle that a direction indicated by the tip end being curved upward with respect to the horizontal plane is thirty (30) degrees is drawn by a dotted line, and the first direction indicating object 260*a* when an angle that a direction indicated by the tip end being curved downward with respect to the horizontal plane is thirty (30) degrees is drawn by a one-dotted line.

In addition, in the second embodiment, since the indicating object 260 is arranged so that the plane becomes vertical or parallel the plane of the indicating object 260 to the horizontal plane in the virtual space in a state where the first direction indicating portion 260*a* is not deformed dependent on whether the depression angle or the elevation angle of the virtual camera 250 is less than or equal to or larger than forty-five (45) degrees, there is an occasion that the plane of the indicating object 260 is imaged by the virtual camera 250 in a direction other than the front. Therefore, in the second embodiment, a shape of the indicating object 260 is expressed a borderline only.

Figure 28A:
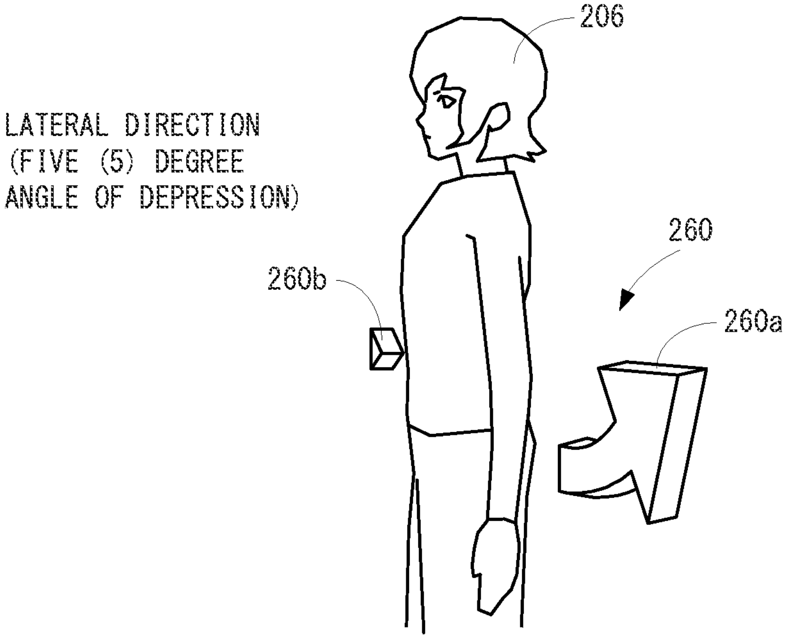
FIG. 28A is a view showing a non-limiting example relationship between the player character and the indicating object of the second embodiment in the virtual space viewed from side.
Figure 28B:
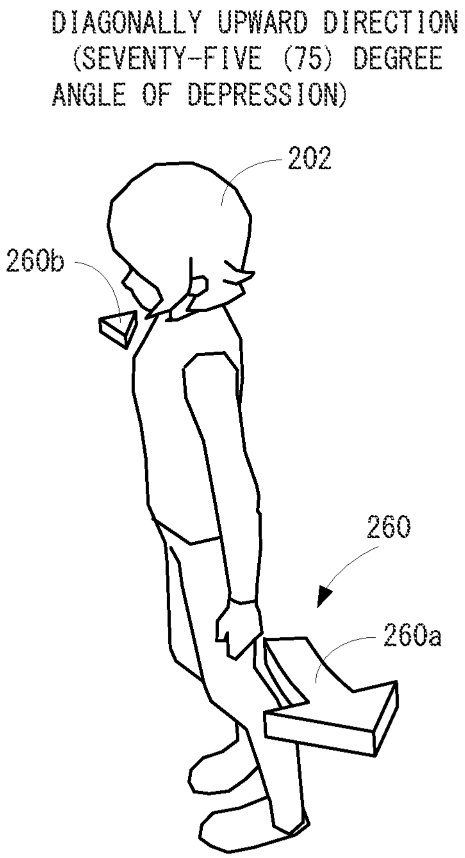
FIG. 28B is a view showing the non-limiting example relationship between the player character and the indicating object of the second embodiment in the virtual space viewed from diagonally above.
Figure 28C:
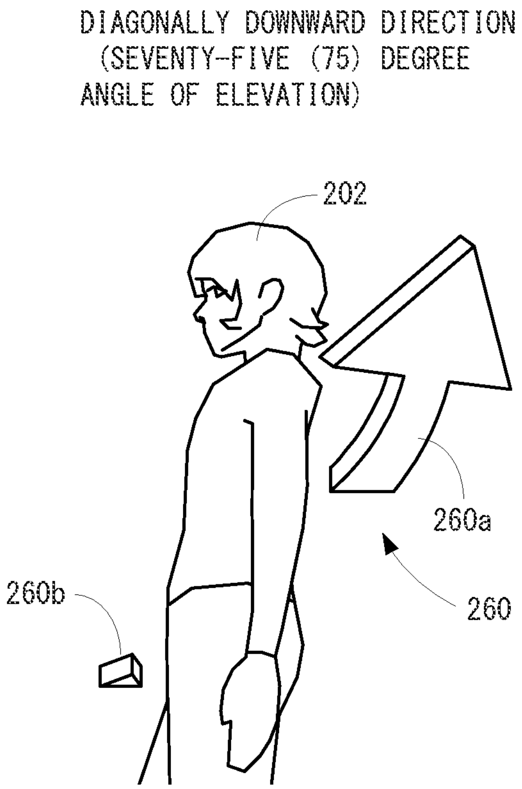
FIG. 28C is a view showing the non-limiting example relationship between the player character and the indicating object of the second embodiment in the virtual space viewed from diagonally below.

FIG. 28A is a view showing a non-limiting example relationship between the player character 202 and the indicating object 260 viewed from side, FIG. 28B is a view showing the non-limiting example relationship between the player character 202 and the indicating object 260 viewed from diagonally above, and FIG. 28C is a view showing the non-limiting example relationship between the player character 202 and the indicating object 260 viewed from diagonally below.

In FIG. 28A, the virtual camera 250 is arranged beside the player character 202 and the indicating object 260, and the depression angle of the virtual camera 250 is set to five (5) degrees. Although the orientation of the player character 202 differs, the virtual camera 250 is arranged so that a positional relationship between the player character 202 and the virtual camera 250 becomes as shown in FIG. 13A and FIG. 13B. That is, the depression angle is less than forty-five (45) degrees. Therefore, the indicating object 260 is arranged so that the plane of the indicating object 260 may become perpendicular to the horizontal plane.

In FIG. 28B, the virtual camera 250 is arranged diagonally above of the player character 202 and the indicating object 260, and the depression angle of the virtual camera 250 is set to seventy-five (75) degrees. That is, the depression angle is equal to or larger than forty-five (45) degrees. Therefore, the indicating object 260 is arranged so that the plane of the indicating object 260 may become parallel to the horizontal plane.

In FIG. 28C, the virtual camera 250 is arranged diagonally below the player character 202 and the indicating object 260, and the elevation angle of the virtual camera 250 is set to seventy-five (75) degrees. That is, the elevation angle is equal to or larger than forty-five (45) degrees. Therefore, the indicating object 260 is arranged so that the plane of the indicating object 260 may become parallel to the horizontal plane.

Since the orientation of the plane of the indicating object 260 is thus changed dependent on a magnitude of the depression angle or the elevation angle (i.e., position) of the virtual camera 250, it is possible for the player to see always the plane of the indicating object 260. Therefore, it is possible for the player to recognize also the direction of the target point while making the virtual camera 250 move to grasp the surrounding situation.

Figure 29:
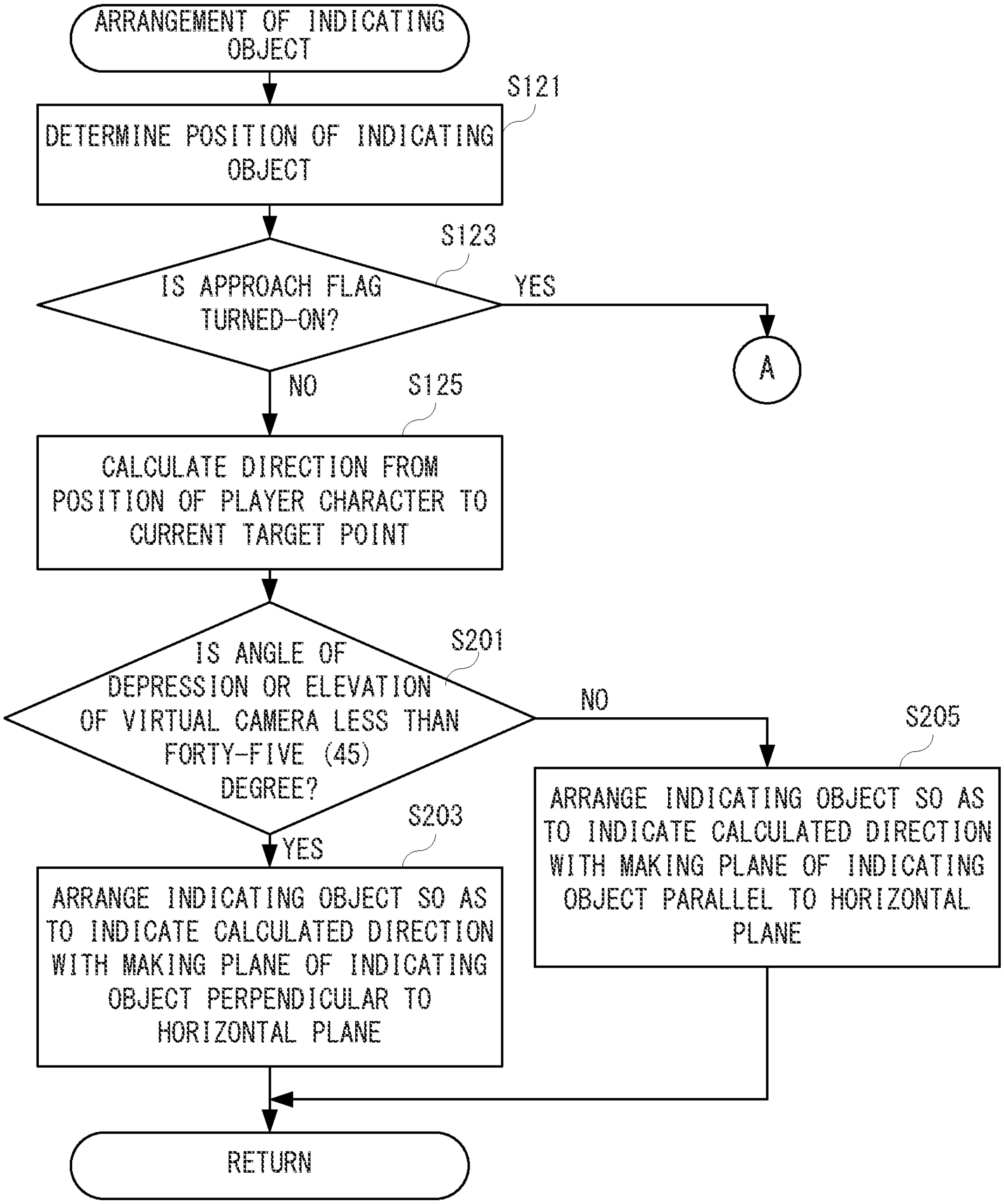
FIG. 29 is a flowchart showing a part of non-limiting example indicating object arrangement processing of the second embodiment.

In the second embodiment, since only a point that the indicating object 260 is rendered according to the image generator 852*b* is different from the first embodiment, a description for the memory map 850, etc. is omitted here. That is, in the second embodiment, a part of the indicating object arrangement processing described in the first embodiment is changed. FIG. 29 shows steps of the flowchart of indicating object arrangement processing of the processor 81 of the second embodiment. As shown in FIG. 29, in the indicating object arrangement processing of the second embodiment, instead of the step S127 of the indicating object arrangement processing of the first embodiment, steps S201, S203 and S205 are executed.

As shown in FIG. 29, following the processing of the step S125, in the step S201, it is determined, with reference to the virtual camera data 854*e*, whether the depression angle or the elevation angle of the virtual camera 250 is less than forty-five (45) degrees.

If "YES" is determined in the step S201, that is, if the depression angle or the elevation of the virtual camera 250 is less than forty-five (45) degrees, in the step S203, the indicating object 260 is arranged so as to indicate the direction calculated in the step S125 while making the plane of the indicating object 260 perpendicular to the horizontal plane, and terminating the indicating object arrangement processing and returning to the game image generation processing in the step S7.

In the step S203, as described using FIG. 25A and FIG. 25B, the indicating object 260 is arranged so that the plane of the indicating object 260 faces the horizontal component of the direction calculated in the step S125 while making the plane of the indicating object 260 perpendicular to the horizontal plane with not being deformed. Moreover, when the direction calculated in the step S125 has a vertical component, the first direction indicating portion 260*a* is curved in the up/down direction so that the tip end thereof faces that direction. That is, the first direction indicating portion 260*a* is curved in a width direction.

On the other hand, if "NO" is determined in the step S201, that is, if the depression angle or the elevation angle of the virtual camera 250 is equal to or larger than forty-five (45) degrees, in a step S205, the indicating object 260 is arranged so as to indicate the direction calculated in the step S125 while making the plane of the indicating object 260 parallel to the horizontal plane, and terminating the indicating object arrangement processing and returning to the game image generation processing in the step S7.

In the step S205, as described using FIG. 27A and FIG. 27B, the indicating object 260 is arranged so that the plane of the indicating object 260 faces the horizontal component of the direction calculated in the step S125 while making the plane of the indicating object 260 be parallel to the horizontal plane with not being deformed. Moreover, when the direction calculated in the step S125 has a vertical component, the first direction indicating portion 260*a* is curved in the up/down direction so that the tip end thereof faces that direction. That is, the first direction indicating portion 260*a* is curved in a thickness direction.

In also the second embodiment, since the orientation of the indicating object indicates not only the horizontal direction of the target point viewed from the player character but also the height direction of the target point viewed from the player character, it is possible to confirm always the direction that the player character is to be moved, and to confirm the positional relationship between the player character and the target point in the height direction.

In addition, in the second embodiment, when the depression angle or the elevation angle of the virtual camera is less than forty-five (45) degrees, the plane of the indicating object in a state where the first direction indicating portion is not being deformed is arranged perpendicular to the horizontal plane, and when the depression angle or the elevation angle of the virtual camera is equal to or larger than forty-five (45) degrees, the plane of the indicating object in a state where the first direction indicating portion is not being deformed is arranged parallel to the horizontal plane; however, should not be limited. In another example, regardless of a magnitude of the depression angle or the elevation angle of the virtual camera, the indicating object may be arranged so that the plane of the indicating object in a state where the first direction indicating portion is not being deformed is arranged perpendicular to the sight line of the virtual camera. That is, the indicating object may be arranged with being leaned so that the plane of the indicating object is made to face to the virtual camera. However, also in this case, the first direction indicating portion may be deformed as necessary in order to indicate the target point.

Moreover, in the second embodiment, although the height direction of the player character and the target point is indicated by deforming the first direction indicating portion, it does not need to be limited to this. Only the first direction indicating portion may be leaned, or similar to the first embodiment, the indicating object, i.e., the first direction indicating portion and the second direction indicating portion may be leaned. A method of making the first direction indicating portion or the indicating object be leaned is the same as the method described in the first embodiment. However, when only the first direction indicating portion it to be leaned, the first direction indicating portion is rotated or turned in the up/down direction centering on the center or center of gravity thereof.

Furthermore, although the indicating object has a thickness in the second embodiment, it is not necessary to have the thickness.

In addition, although the game system 1 is shown as an example of a game system in the above-described embodiments, its configuration should not be limited, and other configurations may be adopted. For example, in the above-described embodiments, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessor) 101 and 111 provided on the controllers.

Moreover, although a case where the game image is displayed on the display 12 is described in the above-described embodiments, it does not need to be limited to this. The game image can be displayed also on a stationary monitor (for example, television monitor) by connecting the main body apparatus 2 to the stationary monitor via a cradle. In such a case, it is possible to constitute a game system including the game system 1 and the stationary monitor.

Furthermore, although the above-described embodiments are described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, or a game apparatus such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiments are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored with a game program executable by an information processing apparatus, wherein the game program causes one or more processors of the information processing apparatus to execute:

setting a predetermined position in a virtual space as a target point;

arranging an indicating object having a first portion and a second portion within a predetermined range on the basis of a position of a player character in the virtual space;

moving the player character in the virtual space based on an operation input by a player;

updating an orientation of the indicating object so that the first portion becomes a position closer to the target point than the player character and the second portion becomes a position farther from the target point than the player character, and a horizontal component of a direction toward the first portion from the second portion faces the target point;

updating, based on a component of a height direction of a direction toward the target point from the position of the player character, a height of an end portion of the first portion on a side of the target point; and generating, based on a virtual camera in the virtual space, a display image including at least the indicating object and the player character.

2. The storage medium according to the claim 1, wherein the indicating object includes a first object and a direction indicating portion indicating a direction up to the target point, and the game program further causes the one or more processors to execute:

arranging the first object so as to surround the player character;

updating the orientation of the indicating object by rotating the indicating object around a center of the first object so that the direction indicating portion faces the target point with respect to a horizontal direction; and updating the height of the direction indicating portion by changing, based on a component of a height direction of a direction toward the target point from the position of the player character, a lean of the indicating object.

3. The storage medium according to the claim 2, wherein the first object is a circular-ring-shape or a cylindrical shape, and the first portion is a first circular arc that is a part of the first object on a side of the direction indicating portion, and the second portion is a second circular arc that is a part of the first object on a side opposite to the direction indicating portion.

4. The storage medium according to the claim 2, wherein the direction indicating portion is a triangular shape, and the game program causes the one or more processors to execute arranging the direction indicating portion so that a predetermined tip end of the direction indicating portion faces a side of the target point.

5. The storage medium according to the claim 2, wherein a part of the first object is rendered with a visual feature different from another part of the first object.

6. The storage medium according to the claim 2, wherein the game program causes the one or more processors to execute:

generating a second object when a relationship between the player character and the target point satisfies a predetermined condition; and moving the second object toward the target point from the first object.

7. The storage medium according to the claim 6, wherein the game program causes the one or more processors to execute arranging the indicating object in the virtual space during when the predetermined condition is not satisfied while not arranging the indicating object in the virtual space during when the predetermined condition is being satisfied.

8. The storage medium according to the claim 1, wherein the first portion has a first end portion and includes an arrow-shaped plane having a tip end at a side of the first end portion, and the second portion has a second end portion and a plane having a tip end at an opposite side to a side of the second end portion, wherein the game program causes the one or more processors to execute:

arranging the first portion and the second portion so as to sandwich the player character; and deforming the first portion or changing a lean of the first portion so that a height of the first end portion is changed based on a component of the height direction of a direction toward the target point from the position of the player character.

9. The storage medium according to the claim 8, wherein the second portion is a shape including a triangular plane, and the game program causes the one or more processors to execute arranging the second portion so that the tip end faces a side of the target point.

10. The storage medium according to the claim 8, wherein the game program causes the one or more processors to execute:

deforming the first portion or changing the lean of the first portion when the position of the player character is higher than the target point so that the position of the first end portion becomes a position lower than a position of the first end portion in a case where the position of the player character is not higher than the target point; and deforming the first portion or changing the lean of the first portion when the position of the player character is lower than the target point so that the position of the first end portion becomes a position higher than the position of the first end portion in a case where the position of the player character is not lower than the target point.

11. The storage medium according to the claim 8, wherein the game program causes the one or more processors to execute:

rotating the first portion so that a part of the arrow-shaped plane of the first portion faces a direction of the virtual camera; and further deforming the first portion or further changing the lean of the first portion while maintaining the position of the first end portion when the first portion is rotated.

12. A game system comprising one or more processors, wherein the one or more processors executes:

setting a predetermined position in a virtual space as a target point;

arranging an indicating object having a first portion and a second portion within a predetermined range on the basis of a position of a player character in the virtual space;

moving the player character in the virtual space based on an operation input by a player;

updating an orientation of the indicating object so that the first portion becomes a position closer to the target point than the player character and the second portion becomes a position farther from the target point than the player character, and a horizontal component of a direction toward the first portion from the second portion faces the target point;

updating, based on a component of a height direction of a direction toward the target point from the position of the player character, a height of an end portion of the first portion on a side of the target point; and generating, based on a virtual camera in the virtual space, a display image including at least the indicating object and the player character.

13. The game system according to the claim 12, wherein the indicating object includes a first object and a direction indicating portion indicating a direction up to the target point, and a game program further causes the one or more processors to execute:

arranging the first object so as to surround the player character;

updating the orientation of the indicating object by rotating the indicating object around a center of the first object so that the direction indicating portion faces the target point with respect to a horizontal direction; and updating the height of the direction indicating portion by changing, based on a component of a height direction of a direction toward the target point from the position of the plyer character, a lean of the indicating object.

14. The game system according to the claim 13, wherein the first object is a circular-ring-shape or a cylindrical shape, and the first portion is a first circular arc that is a part of the first object on a side of the direction indicating portion, and the second portion is a second circular arc that is a part of the first object on a side opposite to the direction indicating portion.

15. The game system according to the claim 13, wherein the direction indicating portion is a triangular shape, and the game program causes the one or more processors to execute arranging the direction indicating portion so that a predetermined tip end of the direction indicating portion faces a side of the target point.

16. The game system according to the claim 13, wherein a part of the first object is rendered with a visual feature different from another part of the first object.

17. The game system according to the claim 13, wherein the game program causes the one or more processors to execute:

generating a second object when a relationship between the player character and the target point satisfies a predetermined condition; and moving the second object toward the target point from the first object.

18. The game system according to the claim 17, wherein the game program causes the one or more processors to execute arranging the indicating object in the virtual space during when the predetermined condition is not satisfied while not arranging the indicating object in the virtual space during when the predetermined condition is being satisfied.

19. The game system according to the claim 12, wherein the first portion has a first end portion and includes an arrow-shaped plane having a tip end at a side of the first end portion, and the second portion has a second end portion and a plane having a tip end at an opposite side to a side of the second end portion, wherein a game program causes the one or more processors to execute:

arranging the first portion and the second portion so as to sandwich the player character; and deforming the first portion or changing a lean of the first portion so that a height of the first end portion is changed based on a component of the height direction of a direction toward the target point from the position of the player character.

20. The game system according to the claim 19, wherein the second portion is a shape including a triangular plane, and the game program causes the one or more processors to execute arranging the second portion so that the tip end faces a side of the target point.

21. The game system according to the claim 19, wherein the game program causes the one or more processors to execute:

deforming the first portion or changing the lean of the first portion when the position of the player character is higher than the target point so that the position of the first end portion becomes a position lower than a position of the first end portion in a case where the position of the player character is not higher than the target point; and deforming the first portion or changing the lean of the first portion when the position of the player character is lower than the target point so that the position of the first end portion becomes a position higher than the position of the first end portion in a case where the position of the player character is not lower than the target point.

22. The game system according to the claim 19, wherein the game program causes the one or more processors to execute:

rotating the first portion so that a part of the arrow-shaped plane of the first portion faces a direction of the virtual camera; and further deforming the first portion or further changing the lean of the first portion while maintaining the position of the first end portion when the first portion is rotated.

23. A game control method in a game apparatus comprising one or more processors, wherein the game control method causes the one or more processors to execute:

setting a predetermined position in a virtual space as a target point;

arranging an indicating object having a first portion and a second portion within a predetermined range on the basis of a position of a player character in the virtual space;

moving the player character in the virtual space based on an operation input by a player;

updating an orientation of the indicating object so that the first portion becomes a position closer to the target point than the player character and the second portion becomes a position farther from the target point than the player character, and a horizontal direction of a direction toward the first portion from the second portion faces the target point;

updating, based on a component of a height direction of a direction toward the target point from the position of the player character, a height of an end portion of the first portion on a side of the target point; and generating, based on a virtual camera in the virtual space, a display image including at least the indicating object and the player character.

24. The game control method according to the claim 23, wherein the indicating object includes a first object and a direction indicating portion indicating a direction up to the target point, and the game program further causes the one or more processors to execute:

arranging the first object so as to surround the player character;

updating the orientation of the indicating object by rotating the indicating object around a center of the first object so that the direction indicating portion faces the target point with respect to a horizontal direction; and updating the height of the direction indicating portion by changing, based on a component of a height direction of a direction toward the target point from the position of the plyer character, a lean of the indicating object.

* * * * *